(12) United States Patent
McCarty et al.

(10) Patent No.: US 10,187,678 B2
(45) Date of Patent: Jan. 22, 2019

(54) SYSTEMS AND METHODS FOR DISPLAYING SEGMENTS OF MEDIA GUIDANCE DATA

(71) Applicant: Rovi Guides, Inc., San Carlos, CA (US)

(72) Inventors: Michael McCarty, Agoura Hills, CA (US); Mikhail Aksenfeld, Castaic, CA (US); Corey Tulis, Portland, OR (US); David Wittke, Simi Valley, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/410,554

(22) Filed: Jan. 19, 2017

(65) Prior Publication Data

US 2018/0139484 A1 May 17, 2018

Related U.S. Application Data

(60) Provisional application No. 62/423,564, filed on Nov. 17, 2016.

(51) Int. Cl.
| | |
|---|---|
| *H04N 5/445* | (2011.01) |
| *H04N 21/262* | (2011.01) |
| *H04N 21/235* | (2011.01) |
| *H04N 21/431* | (2011.01) |
| *H04N 21/435* | (2011.01) |
| *H04N 21/482* | (2011.01) |
| *H04N 21/84* | (2011.01) |

(52) U.S. Cl.
CPC ..... *H04N 21/26283* (2013.01); *H04N 21/235* (2013.01); *H04N 21/431* (2013.01); *H04N 21/435* (2013.01); *H04N 21/482* (2013.01); *H04N 21/4821* (2013.01); *H04N 21/84* (2013.01)

(58) Field of Classification Search
CPC ......... H04N 21/23109; H04N 21/4332; H04N 21/4622; H04N 21/472; H04N 21/482; H04N 21/4828
See application file for complete search history.

(56) References Cited

U.S. PATENT DOCUMENTS

| | | | |
|---|---|---|---|
| 5,630,119 A * | 5/1997 | Aristides | ................ H04N 7/165 |
| 6,239,794 B1 | 5/2001 | Yuen et al. | |
| 6,564,378 B1 | 5/2003 | Satterfield et al. | |
| 7,165,098 B1 | 1/2007 | Boyer et al. | |

(Continued)

FOREIGN PATENT DOCUMENTS

EP    1317141    6/2003

*Primary Examiner* — Pankaj Kumar
*Assistant Examiner* — Timothy R Newlin
(74) *Attorney, Agent, or Firm* — Haley Guiliano LLP

(57) ABSTRACT

Systems and methods are provided herein for substituting an updated segment of media guidance data that no longer includes a selected media asset identifier with another segment of media guidance data that includes the selected media asset identifier. A media guidance application may determine, following an update to a segment of media guidance data, that a selected media asset identifier, associated with a given media asset classifier, is no longer included in the updated segment of media guidance data. The media guidance application may retrieve another segment of media guidance data that is associated with the given media asset classifier and that includes the selected media asset identifier.

20 Claims, 6 Drawing Sheets

(56) References Cited

U.S. PATENT DOCUMENTS

| | | | |
|---|---|---|---|
| 7,370,343 B1 | 5/2008 | Ellis | |
| 7,761,892 B2 | 7/2010 | Ellis et al. | |
| 8,046,801 B2 | 10/2011 | Ellis et al. | |
| 8,760,474 B2 | 6/2014 | Jain et al. | |
| 2002/0053085 A1* | 5/2002 | Toguri | H04N 21/235 725/51 |
| 2002/0174430 A1 | 11/2002 | Ellis et al. | |
| 2003/0197686 A1* | 10/2003 | Usuda | G06F 1/1626 345/169 |
| 2005/0022237 A1* | 1/2005 | Nomura | H04N 5/44543 725/39 |
| 2005/0071874 A1* | 3/2005 | Elcock | H04N 5/44543 725/53 |
| 2005/0097605 A1* | 5/2005 | Itou | H04H 60/72 725/45 |
| 2005/0251827 A1 | 11/2005 | Ellis et al. | |
| 2006/0174271 A1* | 8/2006 | Chen | H04H 60/25 725/39 |
| 2006/0212906 A1* | 9/2006 | Cantalini | H04N 5/44543 725/62 |
| 2006/0230415 A1* | 10/2006 | Roeding | H04N 7/173 725/34 |
| 2006/0253509 A1 | 11/2006 | Slothouber | |
| 2007/0055709 A1 | 3/2007 | Jung et al. | |
| 2007/0199024 A1* | 8/2007 | Noh | H04N 5/4401 725/46 |
| 2008/0022297 A1* | 1/2008 | Walter | H04L 29/06027 725/25 |
| 2008/0256580 A1* | 10/2008 | Yang | H04N 5/4401 725/61 |
| 2009/0106700 A1* | 4/2009 | Nobori | H04N 7/17318 715/838 |
| 2009/0293088 A1* | 11/2009 | Mukerji | H04N 5/44543 725/47 |
| 2010/0107197 A1* | 4/2010 | McGowan | H04H 60/25 725/50 |
| 2010/0153885 A1 | 6/2010 | Yates | |
| 2010/0174680 A1* | 7/2010 | Yamagishi | H04N 7/163 707/622 |
| 2010/0180007 A1* | 7/2010 | Suh | H04N 21/235 709/217 |
| 2012/0291071 A1* | 11/2012 | Seo | H04N 21/26283 725/41 |
| 2014/0104495 A1* | 4/2014 | Preston | H04N 21/4821 348/570 |
| 2015/0012590 A1* | 1/2015 | Goodwin | H04N 21/25 709/203 |
| 2016/0353134 A1* | 12/2016 | Panje | H04N 5/4401 |

\* cited by examiner

SYSTEMS AND METHODS FOR DISPLAYING SEGMENTS OF MEDIA GUIDANCE DATA

CROSS-REFERENCE TO RELATED APPLICATION

This application claims the benefit of U.S. Provisional Patent Application No. 62/423,564 filed Nov. 17, 2016, which is hereby incorporated by reference it its entirety.

BACKGROUND

Media guidance data is transmitted from content providers to user equipment devices (e.g., set-top boxes) to inform users about media content available for consumption. Given the large size of media guidance data sets and finite storage capacity of user equipment devices, user equipment devices may receive only a segment of media guidance data at any given time. Media guidance data change frequently and segments of media guidance data at user equipment devices is updated to reflect these changes. As a result of the updates, a media asset identifier that was previously included in a given media guidance data segment may no longer be included in that media guidance data segment after an update. Media asset identifiers disappearing from a currently viewed segment of media guidance data can be frustrating to users. This problem is particularly acute when a user selects a media asset identifier in a currently viewed segment of media guidance data and the media asset identifier is removed from the currently viewed segment due to an update. The user has to manually navigate through various segments of media guidance data to locate the media asset identifier, resulting in a less than satisfactory user experience.

SUMMARY

Therefore, systems and methods are disclosed herein for substituting an updated segment of media guidance data that no longer includes a selected media asset identifier with another segment of media guidance data that includes the selected media asset identifier. Following an update to a segment of media guidance data, a media guidance application may determine that a selected media asset identifier, associated with a given media asset classifier, is no longer included in the updated segment of media guidance data. The media guidance application may retrieve another segment of media guidance data that is associated with the given media asset classifier and that includes the selected media asset identifier.

In some aspects, a media guidance application may retrieve, from a remote server, a first media guidance data segment that includes a first plurality of media asset classifiers and a first plurality of media asset identifiers corresponding to a first classifier of the first plurality of media asset classifiers. A media asset classifier may be a media asset characteristic that is used to group together media assets associated with the media asset characteristic. The media guidance application may request a segment of media guidance data based on user input navigating through media asset identifiers or media asset classifiers (e.g., a user scrolling through a grid-guide format or video-on-demand listings). The segments of the media guidance data are linked together based on a relationship to how a user navigates through the segments and are stored at a remote server until requested by the media guidance application.

For example, the media guidance application may retrieve one media guidance data segment at a time, which fills a display, such as a media guidance data segment containing five media asset classifiers and six media asset identifiers that are associated with one of the displayed media asset classifiers. If a user navigates up from the first title in the segment or down from the last title in the segment, the media guidance application may access a data structure associated with the segment (e.g., next segment identification data structure) to determine a segment identifier (e.g., segment ID, a pointer) for a next segment to be retrieved. As an illustrative example, each entry in the next segment identification data structure may include a user input received field and an identifier for a next segment to be retrieved field. Similarly, when a user navigates from a currently selected media asset classifier to another media asset classifier displayed in the segment, the media guidance application may access the next segment identification data structure to determine an identifier for a next segment to be retrieved. The media guidance application may use the retrieved segment identifier to retrieve the corresponding segment from the remote server. In this way, the media guidance application retrieves only media guidance data necessary to generate the current display and can operate efficiently in a memory-constrained environment.

In some embodiments, the media guidance application may, when retrieving the first media guidance data segment, query (e.g., by using database management languages such as SQL, JAPQL, CODASYL or another suitable language and an appropriate data segment identifier) a content provider database located at the remote server for the first media guidance data segment. The media guidance application may then retrieve the first media guidance data segment returned by the query result. The media guidance application may generate for display, at a user equipment device, the first media guidance data segment. For example, the media guidance application may generate for display the first media guidance data segment on a television connected to a set-top box. As an illustrative example, the first media guidance data segment may include media asset classifiers comedy TV programs, comedy movies, fantasy TV programs, fantasy movies and drama TV programs. The first media guidance data segment may also include media assets identifiers for "Game of Thrones," "Westworld," "Supernatural," "Grimm," "Agents of S.H.I.E.L.D.," and "American Horror Story," that are all associated with the fantasy TV programs classifier.

The media guidance application may determine a current position of a movable indicator in a display of the first media guidance data segment. A movable indicator may be a cursor, a highlight box or other suitable movable indicators. As an illustrative example, the display of the first media guidance data segment may have an associated with a two-dimensional Cartesian coordinate system that uniquely defines each point in the display. The media guidance application may access a data structure associated with the movable indicator to retrieve its current position in the display of the first media guidance data segment. For example, the movable indicator may be a cursor and the media guidance application may determine the current position to be coordinates (1,1) in the display.

The media guidance application may determine, based on comparing the current position of the movable indicator with positions of the first plurality of media asset identifiers in the display of the first media guidance data segment, a media asset identifier of the first plurality of media asset identifiers that is currently selected. As an illustrative example, a given media asset identifier may be associated with four coordinates and any point of the display that falls in the area defined by the four coordinates is associated with the given media asset identifier. For example, media asset identifier "American Horror Story" may be associated with coordinates (0,0), (0,2), (2,0) and (2,2). The media guidance application may determine, based on coordinates of the cursor (e.g., (1,1)) being included in the area encompassed by the coordinates for "American Horror Story," the currently selected media asset is "American Horror Story."

The media guidance application may receive, from the remote server, an updated first media guidance data segment that includes an update to the first media guidance data. An update to the first media guidance data segment may entail a change in the media asset classifiers and/or media asset identifiers included in the first media guidance data segment. As an illustrative example, new media asset identifiers may be added to a given media asset classifier. For the case where media asset identifiers are organized according to some criteria (e.g., alphabetical order, popularity, user preferences), the addition of the new media asset identifiers may result in a reorganization of the order in which media asset identifiers are distributed among data segments associated with the given media asset classifier. As an illustrative example, media asset identifiers may be organized according to popularity in the first media guidance data segment, which can include at most six media asset identifiers. "American Horror Story" may have a popularity ranking of six on a ranking scale where a ranking of one corresponds to most popular. During the update, a media asset identifier, which corresponds to media asset "Once Upon a Time," that is more popular than media asset "American Horror Story," may be added to the fantasy TV programs classifier. As a result, the first media guidance data segment may be updated such that "American Horror Story" is replaced with "Once Upon a Time."

The media guidance application may compare the media asset identifier that is currently selected with media asset identifiers included in the updated first media guidance data segment. For example, the media guidance application may compare, using a Boolean comparison function (e.g., a string compare function), a unique identifier (e.g., a string of characters) associated with the currently selected media asset identifier with unique identifiers associated with media asset identifiers included in the updated first media guidance data segment. The media guidance application may determine, based on the media asset identifier that is currently selected not matching any of the media asset identifiers included in the updated first media guidance data segment, that the updated first media guidance data segment does not include the media asset identifier that is currently selected. As an illustrative example, the media guidance application may determine, based on receiving a false result for (currently selected media asset identifier—media asset identifiers in updated segment) Boolean comparison function, that the updated first media guidance data segment does not include "American Horror Story."

The media guidance application may, in response to determining that the updated first media guidance data segment does not include the media asset identifier that is currently selected, retrieve, from the remote server, a second media guidance data segment that is associated with the first classifier and that includes the media asset identifier that is currently selected. For example, the media guidance application may retrieve a second media guidance data segment that includes the selected media asset identifier "American Horror Story," along with other media asset identifiers associated with the fantasy TV programs classifier (e.g., "The Originals," "Lost Girl," "Merlin," "Charmed," and "Bewitched.").

In some embodiments, the media guidance application may generate for display, at a user equipment device, a first media guidance data segment that includes a first media asset classifier and a plurality of media asset identifiers corresponding to the first media asset classifier. As an illustrative example, the media guidance application may display on a television a media guidance data segment that includes media asset classifiers comedy TV programs, comedy movies, fantasy TV programs, fantasy movies and drama TV programs and media asset identifiers associated with the fantasy TV programs classifier (e.g., "Game of Thrones," "Westworld," "Supernatural," "Grimm," "Agents of S.H.I.E.L.D," and "American Horror Story"). The media guidance application may determine a media asset identifier of the first plurality of media asset identifiers that is currently selected. For example, the media guidance application may compare a current position of a movable selector (e.g., a cursor, a highlight box) with the position of each of the media asset identifiers to determine which media asset is currently selected. For example, the media guidance application may determine that "American Horror Story" is the currently selected media asset.

The media guidance application may receive, from a remote server, an updated first media guidance data segment that includes an update to the first media guidance data segment. As an illustrative example, new media asset identifiers may have been added to the fantasy TV programs classifier which resulted in changes in the media asset identifier included in some media guidance data segments associated with the fantasy TV programs classifier. The first media guidance data segment may be updated such that "American Horror Story" is replaced with "Once Upon a Time" and the media guidance application may receive this updated first media guidance data segment. The media guidance application determines that the updated first media guidance data segment does not include the media asset identifier that is currently selected. The media guidance application may compare "American Horror Story" with media asset identifiers included in the updated first media guidance data segment to determine whether the updated first media guidance data segment includes "American Horror Story."The media guidance application may determine, upon determining that no media asset identifier included in the first media guidance data segment matches "American Horror Story," that the updated first media guidance data segment does not include "American Horror Story."

The media guidance application may, in response to determining that the updated first media guidance data segment does not include the media asset identifier that is currently selected, retrieve, from the remote server, a second media guidance data segment that is associated with the first media asset classifier and that includes the media asset identifier that is currently selected. For example, the media guidance application may access a data structure associated with the updated first media guidance data segment to determine data segment identifiers for data segments that are associated with the first classifier. The media guidance application may compare "American Horror Story" with media asset identifiers included in each of the other data segments associated with the first classifier to identify the data segment that includes "American Horror Story."

In some embodiments, the media guidance application may determine that the currently selected media asset identifier is no longer included in the first classifier. The media guidance application may send a request to the remote server to determine another classifier that may include the currently selected media asset identifier. Specifically, the media guidance application may determine a plurality of media guidance data segments that are associated with the first classifier. For example, a media guidance data segment identifier naming convention may be in the form "classifier identifier-position identifier." As an illustrative example, segment identifiers corresponding to the fantasy TV program classifier may be in the form "FTP-X" where "X" is a number that defines position of a segment associated with the fantasy TV program classifier relative to other segments associated with the fantasy TV program classifier. For example, segment FTP-1 is adjacent to FTP-2 which is turn is adjacent to FTP-3. The media guidance application may determine that segments corresponding to segment identifiers FTP-1 through FTP-10 are associated with the fantasy TV program classifier. The media guidance application may compare the media asset identifier that is currently selected with media asset identifiers included in the plurality of media guidance data segments that are associated with the first classifier. For example, the media guidance application may compare "American Horror Story" to media asset identifiers included in segments corresponding to segment identifiers FTP-1 through FTP-10.

The media guidance application may determine, based on the media asset identifier that is currently selected not matching any of the media asset identifiers included in the plurality of media guidance data segments that are associated with the first classifier, that there is no other media guidance data segment that is associated with the first classifier and that includes the media asset identifier that is currently selected. For example, the media guidance application may determine that no media asset identifier included in segments corresponding to segment identifiers FTP-1 through FTP-10 matches "American Horror Story." Accordingly, the media guidance application may determine that none of the data segments associated with the fantasy TV program classifier includes the media asset identifier "American Horror Story." The media guidance application may transmit a request to the remote server for a media guidance data segment that is associated with another classifier and that includes the media asset identifier that is currently selected. For example, the media guidance application may query content provider database located at the remote server for a data segment that includes "American Horror Story."

In some embodiments, the media guidance application may determine that there is a media guidance data segment associated with another classifier that includes the currently selected media asset identifier and automatically, without requiring any user input, display the media guidance data segment. Specifically, the media guidance application may receive, from the remote server, an indication that there exists a media guidance data segment that is associated with another classifier and that includes the media asset identifier that is currently selected. As an illustrative example, the media guidance application may receive, in response to the query for a data segment that includes "American Horror Story," a segment identifier corresponding to a segment that includes "American Horror Story." For example, the media guidance application may receive segment identifier DTP-1 corresponding to a segment associated with drama TV programs classifier. The media guidance application may determine, based on an entry in a settings data structure, that no user input is required prior to displaying the media guidance data segment that is associated with another classifier and that includes the media asset identifier that is currently selected. For example, the media guidance application may determine that a value associated with a "request user input prior to changing display" field in the settings data structure is false.

The media guidance application may retrieve, from the remote server, the media guidance data segment that is associated with another classifier and that includes the media asset identifier that is currently selected. The media guidance application may generate for display, at the user equipment device, the media guidance data segment that is associated with another classifier and that includes the media asset identifier that is currently selected. As an illustrative example, the media guidance application may retrieve and generate for display the segment corresponding to segment identifier DTP-1 corresponding to a segment associated with the drama TV programs classifier.

In some embodiments, the media guidance application may determine that the currently selected media asset identifier is included in a media guidance data segment associated with another classifier and request user input regarding whether to display the another media guidance data segment. Specifically, the media guidance application may receive, from the remote server, an indication that there exists a media guidance data segment that is associated with another classifier and that includes the media asset identifier that is currently selected. For example, the media guidance application may receive segment identifier DTP-1 corresponding to a segment associated with the drama TV programs classifier in response to a query for a data segment that includes "American Horror Story." The media guidance application may determine, based on an entry in a settings data structure, that user input is required prior to displaying the media guidance data segment that is associated with another classifier and that includes the media asset identifier that is currently selected. For example, the media guidance application may determine that a value associated with a "request user input prior to changing display" field in the settings data structure is true.

The media guidance application may generate for display, at the user equipment device, a notification about the existence of the media guidance data segment that is associated with another classifier and that includes the media asset identifier, where the notification includes a selectable option for receiving user input to display the media guidance data segment that is associated with another classifier and that includes the media asset identifier that is currently selected. For example, the media guidance application may generate for display a notification that "American Horror Story" is now listed under drama TV programs. Do you want to display the drama TV programs segment?" The media guidance application may also generate for display selectable options "Yes" and "No" for receiving a user response to the notification. The media guidance application may, in response to receiving a selection of the selectable option, retrieve, from the remote server, the media guidance data segment that is associated with another classifier and that includes the media asset identifier that is currently selected. The media guidance application may generate for display, at the user equipment device, the media guidance data segment that is associated with another classifier and that includes the media asset identifier that is currently selected. For example, the media guidance application may receive a user selection of the "yes" option. In response, the media guidance application may retrieve and generate for display the segment corresponding to segment identifier DTP-1 corresponding to a segment associated with the drama TV programs classifier.

In some embodiments, the media guidance application may determine that no media guidance data segment includes the media currently selected asset identifier and display a notification that the currently selected media asset identifier is no longer available. Specifically, the media guidance application may receive, from the remote server, an indication that there is no media guidance data segment that is associated with another classifier and that includes the media asset identifier that is currently selected. As an illustrative example, the media guidance application may receive a null result in response to the query for a data segment that includes "American Horror Story." The media guidance application may generate for display, at the user equipment device, a notification that the media asset identifier that is currently selected is no longer available. For example, the media guidance application may generate for display the notification "American Horror Story is no longer available."

In some embodiments, media asset classifiers and media asset identifier may be organized in a display of a media guidance data segment in a specific manner. Specifically, a display of the first media guidance data segment may include the first classifier positioned between a second classifier and a third classifier of the first plurality of media asset classifiers. Each of the second classifier and the third classifier may be associated with at least one other media guidance data segment. For example, in a display of the first media guidance data segment, the fantasy TV Programs classifier may be positioned between the comedy movies classifier and the drama TV programs classifier. For example, comedy movies classifier may be positioned to the left of the fantasy TV programs classifier and the drama TV programs classifier may be positioned to the right of the fantasy TV Programs classifier. The comedy movies classifier may be associated with a data segment (e.g., data segment corresponding to data segment identifier CM-1) that includes media asset identifiers for comedy movies. Tge drama TV programs may be associated with a data segment (e.g., data segment corresponding to data segment identifier DTP-1) that includes media asset identifiers for drama TV programs. In some embodiments, the media guidance application may retrieve and display the data segment associated with the second classifier in response to receiving a selection of the second classifier.

In some embodiments, the number of media asset identifiers associated with a classifier in a media guidance data segment may be less than a maximum number of media asset identifiers that can be simultaneously displayed. In this case, the display of the media guidance data segment may include other media asset identifiers that are associated with another classifier included in the media guidance data segment. Specifically, a number of media asset identifiers in the first plurality of media asset identifiers may be less than a maximum number of media asset identifiers that can be included in the first media guidance data segment. For example, the maximum number of media asset identifiers that can be included in the first media guidance data segment may be nine. The first plurality of media asset identifiers may include only six media asset identifiers (e.g., "Game of Thrones," "Westworld," "Supernatural," "Grimm," "Agents of S.H.I.E.L.D.," and "American Horror Story"). In such instances, the first media guidance data segment may further comprise a fourth classifier and a second plurality of media asset identifiers corresponding to the fourth classifier. For example, the first media guidance data segment may also include a fantasy movie classifier and three fantasy movie media asset identifiers (e.g., "The Neverending Story," "Pan's labyrinth," and "Wizard of Oz"). In a display of the first media guidance data segment, the first classifier and the fourth classifier may be positioned adjacent to each other and between the second classifier and the third classifier. The fantasy TV programs classifier (i.e., the first classifier) and the fantasy movies classifier (i.e., the fourth classifier) may be positioned immediately adjacent to each other and in between the comedy movies classifier (i.e., the second classifier) and the drama TV programs classifier (i.e., the third classifier). For example, the comedy movies classifier may be positioned immediately to the left of the fantasy TV programs classifier and the drama TV programs classifier may be positioned immediately to the right of the fantasy movies classifier.

In some embodiments, the media guidance application may receive a user selection of a classifier of multiple classifiers included in a media guidance data segment. The media guidance application may retrieve and display another media guidance data segment associated with the selected classifier. The display of the retrieved media guidance data segment may include a subset of classifiers that were included in the previous media guidance data segment. Specifically, the media guidance application may receive a user selection of the second classifier. Following from the previous example where the second classifier was the comedy movies classifier, the media guidance application may receive a selection of the comedy movies classifier.

The media guidance application may retrieve, from the remote server, a third media guidance data segment associated with the second classifier, where the third media guidance data segment comprises a second plurality of media asset classifiers that includes at least the first classifier, the second classifier, and a fourth classifier, and a second plurality of media asset identifiers corresponding to the second classifier. Upon receiving a selection of the comedy movies classifier, the media guidance application may access a look-up table to determine an identifier for a data segment associated with the comedy movies classifier. For example, the media guidance application may determine that an identifier for a data segment associated with the comedy movies classifier is CM-1. The media guidance application may then query content provider database for location of the data segment corresponding to identifier CM-1. For example, the media guidance application may retrieve the data segment corresponding to data segment identifier CM-1 that includes media asset classifiers fantasy TV programs (i.e., first classifier), comedy movies (i.e., the second classifier), horror TV programs (i.e., the fourth classifier), comedy TV programs and fantasy movies. The data segment corresponding to data segment identifier CM-1 may also include comedy movie media asset identifiers such as "Groundhog Day," "Bridesmaids," "Clueless," "Zoolander," "Ice Age," and "Kung Fu Panda."

In some embodiments, in a display, the second classifier may be positioned between the first classifier and the fourth classifier. For example, the comedy movies classifier may be positioned between the fantasy TV programs classifier and the horror TV programs classifier. In some embodiments, each of the first classifier and the fourth classifier may be associated with at least one other data segment. The fantasy TV programs classifier may be associated with a data segment (e.g., the data segment corresponding to data segment identifier FTP-1) that includes media asset identifiers for the fantasy TV programs. The horror TV programs classifier may be associated with a data segment (e.g., data segment corresponding to data segment identifier HTP-1) that includes media asset identifiers for horror TV programs.

The media guidance application may generate for display, at the user equipment device, the third media guidance data segment. For example, the media guidance application may display the data segment corresponding to data segment identifier CM-1 on a television connected to a set-top box.

In some embodiments, a display of a media guidance data segment that includes media asset identifiers associated with a first classifier may also include an indication that there are additional media asset identifiers associated with the first classifier that are not currently displayed. The media guidance application may display these additional media asset identifiers upon receiving a user request to view these additional media asset identifiers. The additional media asset identifiers may be organized in the display such that they all precede or they all follow the media asset identifiers that were initially displayed. Specifically, the first media guidance data segment may include an indication that there is a second plurality of media asset identifiers corresponding to the first classifier that includes a subset of media asset identifiers not included in the first plurality of media asset identifiers. For example, the first media guidance data segment may include a selectable indicator (e.g., "Next," "Previous," or "View more media asset") to indicate there are additional media asset identifiers associated with the Fantasy TV program that are not included in the first media guidance data segment. The media guidance application may receive a user input requesting access to the second plurality of media asset identifiers corresponding to the first classifier. For example, the media guidance application may receive a selection of a selectable "Next" option.

The media guidance application may retrieve, from the remote server, a third media guidance data segment that includes the second plurality of media asset identifiers. Upon receiving selection of the selectable "Next" option, the media guidance application may access a look-up table associated with the first media guidance data segment to determine a data segment identifier that corresponds to the selection of the selectable "Next" option. For example, based on the look-up table, the media guidance application may determine that the data segment corresponding to data segment identifier FTP-6 is to be retrieved upon receiving a selection of the "Next" option. The media guidance application may retrieve the data segment corresponding to data segment identifier FTP-6 that includes media asset classifiers comedy TV programs, comedy movies, fantasy TV programs, fantasy movies and drama TV programs and fantasy TV program media asset identifiers "The Originals" and "Lost Girl." The media guidance application may generate for display, at the user equipment device, the third media guidance data segment. For example, the media guidance application may display the data segment corresponding to data segment identifier FTP-6.

In some embodiments, respective position of each media asset identifier of the subset media asset identifiers of the second plurality of media asset identifiers may precede a first media asset identifier of the first plurality of media asset identifiers, where position of the first media asset identifier precedes respective positions of all other media asset identifiers of the first plurality of media asset identifiers. For example, the first plurality of media asset identifiers may be ordered as "Game of Thrones," "Westworld," "Supernatural," "Grimm," "Agents of S.H.I.E.L.D.," and "American Horror Story," where "Game of Thrones" is the first media asset identifier. Positions of media asset identifiers "The Originals" and "Lost Girl" may be before "Game of Thrones."

In some embodiments, respective position of each media asset identifier of the subset media asset identifiers of the second plurality of media asset identifiers may follow a last media asset identifier of the first plurality of media asset identifiers, where position of the last media asset identifier follows respective positions of all other media asset identifiers of the first plurality of media asset identifiers. For example, the first plurality of media asset identifiers may be ordered as "Game of Thrones," "Westworld," "Supernatural," "Grimm," "Agents of S.H.I.E.L.D.," and "American Horror Story," where "American Horror Story" is the last media asset identifier. The position of media asset identifiers "The Originals" and "Lost Girl" may be after "American Horror Story."

Conventional systems may divide, at a remote server, a single large media guidance data block into multiple smaller media guidance data segments. A memory constrained device may request and receive a specific media guidance data segment from the remote server. However, in conventional systems, following an update to a currently displayed segment, memory constrained devices do not automatically detect that a currently selected media asset identifier is no longer included in the updated segment and retrieve another segment that includes the currently selected media asset. As a result, a user has to manually request another media guidance data segment that may include the currently selected media asset identifier. Given the innumerous possible updates and the plethora of available segments, it is a difficult and time consuming process for a user to identify another media guidance data segment that may include the currently selected media asset identifier. This problem is further compounded when the user is provided with very little information about the nature of the update and has to randomly guess another data segment that may include the currently selected media asset identifier. Systems and methods provided herein remove the difficultly involved in locating another segment that includes the currently selected media asset by automatically detecting that a currently selected media asset is no longer included in the updated segment and comparing currently selected media asset identifier with media asset identifiers included in other segments to identify another segment that includes the currently selected media asset identifier.

It should be noted the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

The described systems and methods substitute an updated segment of media guidance data that no longer includes a selected media asset identifier with another segment of media guidance data that includes the selected media asset identifier. Following an update to a segment of media guidance data, a media guidance application may determine that a selected media asset identifier, associated with a given media asset classifier, is no longer included in the segment of media guidance data after the segment of media guidance data is updated. The media guidance application may retrieve another segment of media guidance data that is associated with the given media asset classifier and that includes the selected media asset identifier.

Figure 5:
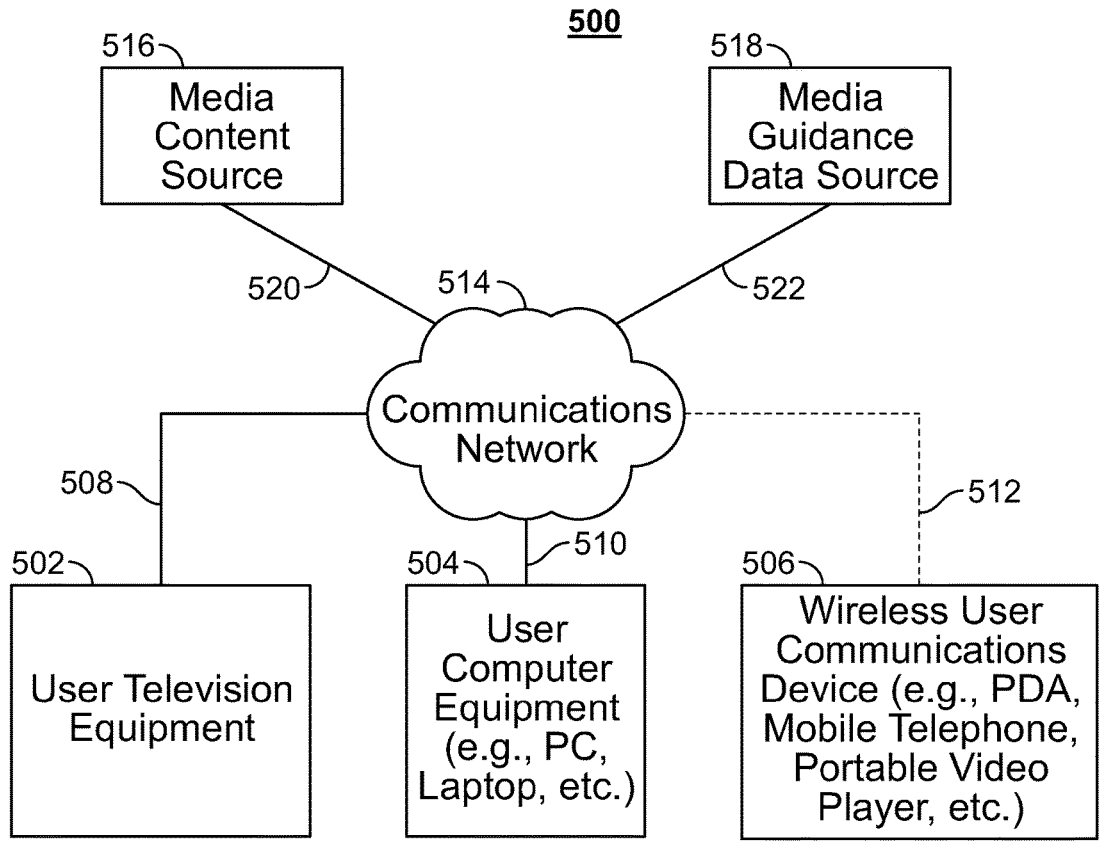
FIG. 5 is a block diagram of an illustrative media system in accordance with some embodiments of the disclosure.

The media guidance application may reside on user television equipment 502 (FIG. 5), user computer equipment 504 (FIG. 5), and/or wireless user communications device 506 (FIG. 5). In some embodiments, some or all portions of the media guidance application may be located at media content source 516 (FIG. 5) and/or media guidance data source 518 (FIG. 5). In some embodiments, portions of the media guidance application may be located on each of user television equipment 502 (FIG. 5), user computer equipment 504 (FIG. 5), wireless user communications device 506 (FIG. 5), media content source 516 (FIG. 5) and media guidance data source 518 (FIG. 5).

Figure 1:
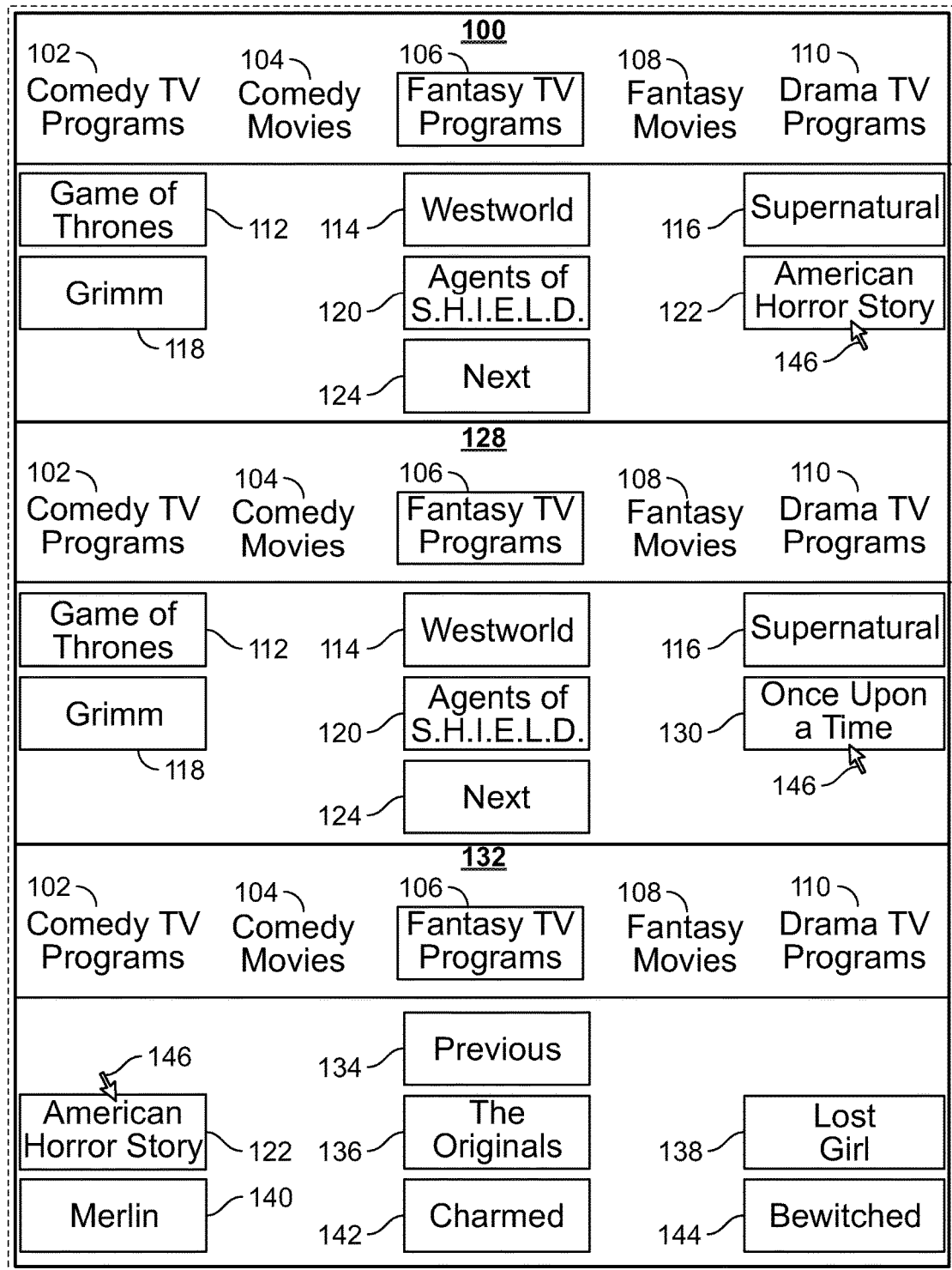
FIG. 1 shows an illustrative display that the media guidance application may generate for display when substituting an updated segment of media guidance data that no longer includes a selected media asset identifier with another segment of media guidance data that includes the selected media asset identifier, in accordance with some embodiments of the disclosure.

FIG. 1 shows an illustrative display that the media guidance application may generate for display when substituting an updated segment of media guidance data that no longer includes a selected media asset identifier with another segment of media guidance data that includes the selected media asset identifier, in accordance with some embodiments of the disclosure. FIG. 1 depicts illustrative displays 100, 128, and 132, which may be presented by control circuitry that executes a media guidance application on any user equipment. The functionality of user equipment, control circuitry, and the media guidance application is described in further detail below with respect to FIGS. 2-5. Control circuitry may cause displays 100, 128, and 132 to be presented using any of processes described in FIGS. 6-8.

The media guidance application may retrieve, from a remote server, a first media guidance data segment that includes a first plurality of media asset classifiers and a first plurality of media asset identifiers corresponding to a first classifier of the first plurality of media asset classifiers. A media asset classifier may be a media asset characteristic that is used to group together media assets associated with the media asset characteristic. A media asset classifier may include, but is not limited to, a genre (e.g., drama, horror, comedy), type of media content (e.g., TV programs, movies, clips), source (e.g., broadcast source, OTT content source), actor, director, and access requirements (e.g., free, one-time fee, subscription). The media guidance application may request a segment of media guidance data based on user input navigating through media asset identifiers or media asset classifiers (e.g., a user scrolling through a grid-guide format or video-on-demand listings). The segments of the media guidance data are linked together based on a relationship to how a user navigates through the segments and are stored at a remote server until requested by the media guidance application.

For example, the media guidance application may retrieve one media guidance data segment at a time, which fills a display, such as a media guidance data segment containing five media asset classifiers and six media asset identifiers that are associated with one of the displayed media asset classifiers. If a user navigates up from the first title in the segment or down from the last title in the segment, the media guidance application may access a data structure associated with the segment (e.g., next segment identification data structure) to determine a segment identifier (e.g., segment ID, a pointer) for a next segment to be retrieved. As an illustrative example, each entry in the next segment identification data structure may include a user input received field and an identifier for a next segment to be retrieved field. Similarly, when a user navigates from a currently selected media asset classifier to another media asset classifier displayed in the segment, the media guidance application may access the next segment identification data structure to determine an identifier for a next segment to be retrieved. The media guidance application may use the retrieved segment identifier to retrieve the corresponding segment from the remote server. In this way, the media guidance application retrieves only media guidance data necessary to generate the current display and can operate efficiently in a memory-constrained environment.

The media guidance application may, when retrieving the first media guidance data segment, query (e.g., by using database management languages such as SQL, JAPQL, CODASYL or another suitable language and an appropriate data segment identifier) a content provider database located at the remote server for the first media guidance data segment. The media guidance application may then retrieve the first media guidance data segment returned by the query result. The media guidance application may generate for display, at a user equipment device, the first media guidance data segment. As an illustrative example, the first media guidance data segment may include media asset classifiers 102, 104, 106, 108 and 108 (e.g., comedy TV programs, comedy movies, fantasy TV programs, fantasy movies and drama TV programs respectively). The first media guidance data segment may also include media assets identifiers 112, 114, 116, 118, 120 and 122 (e.g., "Game of Thrones," "Westworld," "Supernatural," "Grimm," "Agents of S.H.I.E.L.D.," and "American Horror Story," respectively) that are all associated with media asset classifiers 106 (e.g., fantasy TV programs classifier). The media guidance application may generate for display, at a user equipment device, the first media guidance data segment. The media guidance application may generate for display 100 on a television connected to a set-top box. Display 100 may also include selectable option 124 for requesting additional media asset identifiers associated with media asset classifiers 106.

The media guidance application may determine a current position of a movable indicator in a display of the first media guidance data segment. As an illustrative example, the display of the first media guidance data segment may have an associated with a two-dimensional Cartesian coordinate system that uniquely defines each point in the display. The media guidance application may access a data structure associated with the movable indicator to retrieve its current position in the display of the first media guidance data segment. For example, the movable indicator may be a cursor 146 and the media guidance application may determine the current position to be coordinates (11,7) in the display 100.

The media guidance application may determine, based on comparing the current position of the movable indicator with positions of the first plurality of media asset identifiers in the display of the first media guidance data segment, a media asset identifier of the first plurality of media asset identifiers that is currently selected. As an illustrative example, a given media asset identifier may be associated with four coordinates, and any point of the display that falls in the area defined by the four coordinates is associated with the given media asset identifier. For example, media asset identifier 122 (e.g., "American Horror Story") may be associated with coordinates (10,6), (12,6), (10,8) and (12,8). The media guidance application may determine, based on coordinates of the cursor (e.g., (11,7)) being included in the area encompassed by the coordinates for media asset identifier 122, the currently selected media asset is media asset identifier 122.

The media guidance application may receive, from the remote server, an updated first media guidance data segment that includes an update to the first media guidance data. An update to the first media guidance data segment may entail a change in the media asset classifiers and/or media asset identifiers included in the first media guidance data segment. As an illustrative example, new media asset identifiers may be added to a given media asset classifier. For the case where media asset identifiers are organized according to some criteria (e.g., alphabetical order, popularity, user preferences), the addition of the new media asset identifiers may result in a reorganization of the order in which media asset identifiers are distributed among data segments associated with the given media asset classifier.

As an illustrative example, media asset identifiers may be organized according to popularity in the first media guidance data segment which can include at most six media asset identifiers. Media asset identifier 130, which corresponds to a media asset that is more popular than the media asset corresponding to media asset identifier 122, may be added to media asset classifier 106 (e.g., fantasy TV programs classifier). As a result, the first media guidance data segment may be updated such that media asset identifier 122 (e.g., "American Horror Story") is replaced with media asset identifier 130 (e.g., "Once Upon a Time"). In some embodiments, the media guidance application may receive an updated first media guidance data segment because the remote server automatically distributes any updates (e.g., push configuration). In some embodiments, the media guidance application may periodically request the remote server for an updated first media guidance data segment (e.g., pull configuration).

The media guidance application may compare the media asset identifier that is currently selected with media asset identifiers included in the updated first media guidance data segment. For example, the media guidance application may compare, using a Boolean comparison function (e.g., a string compare function), a unique identifier (e.g., a string of characters) associated with media asset identifier 122 with unique identifiers associated with media asset identifiers included in the updated first media guidance data segment (e.g., media asset identifiers 112, 114, 116, 118, 120 and 130). The media guidance application may determine, based on the media asset identifier that is currently selected not matching any of the media asset identifiers included in the updated first media guidance data segment, that the updated first media guidance data segment does not include the media asset identifier that is currently selected. As an illustrative example, the media guidance application may determine, based on receiving a false result for (currently selected media asset identifier—media asset identifiers in updated segment) Boolean comparison function, that display 128 (i.e., the updated first media guidance data segment) does not include media asset identifier 122.

The media guidance application may, in response to determining that the updated first media guidance data segment does not include the media asset identifier that is currently selected, retrieve, from the remote server, a second media guidance data segment that is associated with the first classifier and that includes the media asset identifier that is currently selected. The media guidance application may access a data structure associated with the updated first media guidance data segment, located either at the user equipment device or the remote server, to determine data segment identifiers for data segments that are associated with the first classifier. For example, the media guidance application may retrieve and generate for display the data segment depicted in display 132. The media guidance application may generate for display, in display 132, media asset identifiers 122, 136, 138, 140, 142 and 144 that are associated with media asset classifier 106. The media guidance application may also include in selectable option 134 in display 132 for requesting access to another data segment associated with media asset classifier 106.

The media guidance application may, prior to retrieving the second media guidance data segment, use a variety of techniques to identify the second media guidance data segment. In some embodiments, an update to a segment associated with a media asset classifier may cause a media asset identifier to be moved to another segment, also associated with the media asset classifier. A media asset classifier may be associated with more than one data segment when a number of media asset identifiers associated with the media asset classifier is greater than a maximum number of media asset identifiers that may be included in one data segment. As an illustrative example, the media asset classifier 106 may be associated with 18 media asset identifiers. The maximum number of media asset identifiers that may be included in a data segment may be six. Media guidance data corresponding to media asset classifier 106 may be divided into three segments, where each of the three segments has a unique data segment identifier that indicates that the segments are associated with the media asset classifier 106.

The media guidance application, upon determining that the currently selected media asset identifier is not included in the updated first media guidance data segment, may access other media guidance data segments that are also associated with the first classifier. In order to determine other media guidance data segments that are also associated with the first classifier, the media guidance application may access a data structure (located at any of storage 408, media content source 516 and media guidance data source 518) to determine data segment identifiers for data segments associated with the first classifier. In some embodiments, data segment identifiers for media guidance data segments may follow a pre-defined naming convention. The naming convention may be designed to convey information about a media asset classifier that a given data segment is associated with and a position of the data segment in relation to other data segments that are also associated with the same media asset classifier.

As an illustrative example, naming convention may be in the format "XXX-000," where the "XXX" portion is a unique series of letters that identify the media asset classifier and the "000" portion is a series of numbers that defines the position of the segment in an ordered series of segments associated with the media asset classifier. For example, the "XXX" portion corresponding to media asset classifier 106 may be FTP. For example, the media asset classifier 106 may be associated with three data segments (e.g., media asset classifier 106 may include 18 media asset identifiers and one segment may display a maximum of six media asset identifiers) and data segment identifiers for these three data segments may be FTP-1, FTP-2 and FTP-3. The data segment corresponding to identifier FTP-1 may be the first data segment in the ordered series, and adjacent to the data segment corresponding to identifier FTP-2, which in turn is adjacent to the data segment corresponding to FTP-3.

As referred to herein, a first segment "adjacent to" a second segment should be understood as a first segment that contains media guidance data that was contiguous with media guidance data of the second segment prior to being divided to form segments. In some embodiments, the media guidance data may be media asset identifiers. For example, the identifiers may be ordered alphabetically and divided such that one segment contains media asset identifiers starting with "A-E," the next contains identifiers starting with "F-G," and the next contains "H-Z." The segments containing the identifiers starting with "A-E" and "F-G" are adjacent in that the two segments contain contiguous data. However, the "A-E" and "H-Z" segments were not contiguous prior to division into segments, and thus are not adjacent, because there was data in between the two segments prior to division (e.g., the "F-G" media asset identifiers).

In some embodiments, when determining the second media guidance data segment associated with the first classifier, the media guidance application may access all data segments associated with the first classifier to determine whether any of them includes the selected media asset identifier. In some cases, the number of data segments associated with the first classifier may be very large, and accessing all of them may result in inefficient usage of resources and significant latency. In some embodiments, the media guidance application may selectively access a subset of data segments associated with the first classifier to identify the second media guidance data segment.

In some embodiments, where data segments associated with the first classifier are in an ordered series, an update to a first segment in the ordered series may cause a media asset identifier to be moved to a different segment in the ordered series that has a position relatively close to the first segment. For example, in some embodiments, an update to the data segment corresponding to identifier FTP-5 is more likely to move a media asset identifier to the data segment corresponding to identifier FTP-7, rather than move a media identifier to the data segment corresponding to identifier FTP-25. In some embodiments, the media guidance application may, when determining the second media guidance data segment, only access "n" data segments that are associated with the first classifier, and are adjacent to the first media guidance data segment. The media guidance application may determine the "n" adjacent data segments based on an identifier for the first media guidance data segment and the identifier naming convention. For example, the media guidance application may determine that the identifier for the first media guidance data segment is FTP-5. The media guidance application may determine, based on the naming convention, that identifiers FTP-3, FTP-4, FTP-6 and FTP-7 correspond to four data segments that are adjacent to the first media guidance data segment. The media guidance application may then use these identifiers to access the respective data segments. For example, each of the identifiers may be associated with a pointer to the data segment it identifies. Alternatively, the media guidance application may use an identifier to query a content management database for the data segment corresponding to the identifier. In some embodiments, the media guidance application may access a random subset of data segments associated with media asset classifier 106 to determine the second media guidance data segment.

In some embodiments, when identifying the second media guidance data segment based on selectively accessing a subset of data segments associated with the first classifier, the media guidance application may use data about the update to determine the subset of data segments to access. The media guidance application may use the data about changes made during an update to predict one or more segments that the currently selected media asset identifier may have been moved to, following the update. The media guidance application may then access these predicted data segments to determine whether any of them includes the currently media asset identifier. The media guidance application may access a data structure (e.g., an update summary data structure) to determine changes made during an update.

As an illustrative example, the media guidance application may determine that the update was due to twelve new media asset identifiers being added to media asset classifier 106. The media guidance application may determine (e.g., by accessing a segment properties data structure) that a maximum number of media asset identifiers that may be included in a given data segment is six. For instances where the media asset identifiers are redistributed among segments associated with the media asset classifier 106, according to an ordering criteria (e.g., alphabetical ordering), the media guidance application may determine that, in the worst case scenario (i.e., all 12 media asset identifiers added precede the selected media asset identifier in the first classifier), the selected media asset identifier would be shifted by, at most, two segments. In this case, the media guidance application may access the two data segments that immediately follow the first media guidance data segment to determine if either includes the selected media asset identifier 122. For the case where the data segment identifier of the first media guidance data segment is FTP-5, the media guidance application may determine, based on the segment identifier naming convention, that data segments corresponding to data segment identifiers FTP-6 and FTP-7 immediately follow the first media guidance data segment.

In some embodiments, the media guidance application may determine that the currently selected media asset identifier is no longer included in the first classifier. The media guidance application may send a request to the remote server to determine another classifier that may include the currently selected media asset identifier. Specifically, the media guidance application may determine a plurality of media guidance data segments that are associated with the first classifier." As an illustrative example, the media guidance application may determine that segments corresponding to segment identifiers FTP-1 through FTP-10 are associated with the media asset classifier 106. The media guidance application may compare the media asset identifier that is currently selected with media asset identifiers included in the plurality of media guidance data segments that are associated with the first classifier. For example, the media guidance application may compare media asset identifier 122 to media asset identifiers included in segments associated with media asset classifier 10 (i.e., segments corresponding to segment identifiers FTP-1 through FTP-10).

The media guidance application may determine, based on the media asset identifier that is currently selected not matching any of the media asset identifiers included in the plurality of media guidance data segments that are associated with the first classifier, that there is no other media guidance data segment that is associated with the first classifier and that includes the media asset identifier that is currently selected. For example, the media guidance application may determine that no media asset identifier included in segments corresponding to segment identifiers FTP-1 through FTP-10 matches media asset identifier 122. Accordingly, the media guidance application may determine that none of the data segments associated with media asset classifier 106 includes the media asset identifier 122. The media guidance application may transmit a request to the remote server for a media guidance data segment that is associated with another classifier and that includes media asset identifier 122. For example, the media guidance application may query content provider database located at the remote server for a data segment that is associated with any of media asset classifier 102, 104, 108, and 110 and that includes media asset identifier 122.

In some embodiments, the media guidance application may determine that there is a media guidance data segment associated with another classifier that includes the currently selected media asset identifier and automatically, without any further user input, display the media guidance data segment. Specifically, the media guidance application may receive, from the remote server, an indication that there exists a media guidance data segment that is associated with another classifier and that includes the media asset identifier that is currently selected. As an illustrative example, the media guidance application may receive, in response to the query for a data segment that includes media asset identifier 122, a segment identifier corresponding to a segment that includes media asset identifier 122. For example, the media guidance application may receive segment identifier DTP-1 corresponding to a segment associated with media asset classifier 110. The media guidance application may determine, based on an entry in a settings data structure, that no user input is required prior to displaying the media guidance data segment that is associated with another classifier and that includes the media asset identifier that is currently selected. For example, the media guidance application may determine that a value associated with a "request user input prior to changing display" field in the settings data structure is false.

The media guidance application may retrieve, from the remote server, the media guidance data segment that is associated with another classifier and that includes the media asset identifier that is currently selected. The media guidance application may generate for display, at the user equipment device, the media guidance data segment that is associated with another classifier and that includes the media asset identifier that is currently selected. As an illustrative example, the media guidance application may retrieve and generate for display the segment corresponding to segment identifier DTP-1 corresponding to a segment associated with media asset classifier 110.

In some embodiments, the media guidance application may determine that the currently selected media asset identifier is included in a media guidance data segment associated with another classifier and request user input regarding whether to display the another media guidance data segment. Specifically, the media guidance application may receive, from the remote server, an indication that there exists a media guidance data segment that is associated with another classifier and that includes the media asset identifier that is currently selected. For example, the media guidance application may receive segment identifier DTP-1 corresponding to a segment associated with media asset classifier 110 in response to a query for a data segment that includes media asset identifier 122. The media guidance application may determine, based on an entry in a settings data structure, that user input is required prior to displaying the media guidance data segment that is associated with another classifier and that includes the media asset identifier that is currently selected. For example, the media guidance application may determine that a value associated with a "request user input prior to changing display" field in the settings data structure is true.

The media guidance application may generate for display, at the user equipment device, a notification about the existence of the media guidance data segment that is associated with another classifier and that includes the media asset identifier, where the notification includes a selectable option for receiving user input to display the media guidance data segment that is associated with another classifier and that includes the media asset identifier that is currently selected. For example, the media guidance application may generate for display a notification that media asset identifier 122 is now listed under media asset classifier 110 and a prompt such as "Do you want to display the media asset classifier 110 segment?" The media guidance application may also generate for display selectable options "Yes" and "No" for receiving user response to the notification. The media guidance application may, in response to receiving a selection of the selectable option, retrieve, from the remote server, the media guidance data segment that is associated with another classifier and that includes the media asset identifier that is currently selected. The media guidance application may generate for display, at the user equipment device, the media guidance data segment that is associated with another classifier and that includes the media asset identifier that is currently selected. For example, the media guidance application may receive a user selection of the "yes" option. In response, the media guidance application may retrieve and generate for display the segment corresponding to segment identifier DTP-1 corresponding to a segment associated with media asset classifier 110.

In some embodiments, the media guidance application may determine that there is no other media guidance data segment that includes the media currently selected asset identifier and display a notification that the currently selected media asset identifier is no longer available. Specifically, the media guidance application may receive, from the remote server, an indication that there is no media guidance data segment that is associated with another classifier and that includes the media asset identifier that is currently selected. As an illustrative example, the media guidance application may receive a null result in response to the query for a data segment that includes media asset identifier 122. The media guidance application may generate for display, at the user equipment device, a notification that the media asset identifier that is currently selected is no longer available. For example, the media guidance application may generate for display the notification "Media asset identifier 122 is no longer available."

In some embodiments, media asset classifiers and media asset identifiers may be organized in a display of a media guidance data segment in a specific manner. Specifically, a display of the first media guidance data segment may include the first classifier positioned between a second classifier and a third classifier of the first plurality of media asset classifiers. Each of the second classifier and the third classifier may be associated with at least one other media guidance data segment. For example, in a display of the first media guidance data segment, media asset classifier 106 (e.g., fantasy TV Programs classifier) may be positioned between media asset classifier 104 (e.g., comedy movies classifier) and media asset classifier 110 (e.g., drama TV programs classifier). As an illustrative example, in a display where media asset classifier 106, media asset classifier 104 and media asset classifier 110 are organized horizontally, media asset classifier 104 may be to the left of media asset classifier 106 and media asset classifier 110 may be to the right of media asset classifier 106. As another illustrative example, in a display where media asset classifier 106, media asset classifier 104 and media asset classifier 110 are organized vertically, media asset classifier 104 may be positioned below media asset classifier 106 and media asset classifier 110 may be positioned above media asset classifier 106.

Media asset classifier 104 may be associated with a data segment (e.g., the data segment corresponding to data segment identifier CM-1) that includes media asset identifiers for comedy movies, for example. Media asset classifier 110 may be associated with a data segment (e.g., the data segment corresponding to data segment identifier DTP-1) that includes media asset identifiers for drama TV programs, for example. The data segment identifier associated with the second media asset classifier and the data segment identifier associated with the third media asset classifier may be stored in a data structure associated with the first media guidance data segment. The data structure associated with the first media guidance data segment may include a look-up table that defines a mapping of which data segment is to be retrieved upon receiving a selection of a media asset classifier of the first plurality of media asset classifiers.

As an illustrative example, the media guidance application may receive a selection of media asset classifier 104 in the first media guidance data segment. The media guidance application may access a look-up table, associated with the first media guidance data segment, to determine an identifier for a data segment associated with media asset classifier 104. For example, the media guidance application may determine that data segment identifier CM-1 is associated with the selection of media asset classifier 104. Accordingly, the media guidance application may retrieve and generate for display the data segment corresponding to data segment identifier CM-1.

In some embodiments, the number of media asset identifiers associated with a classifier in a media guidance data segment may be less than a maximum number of media asset identifiers that can be simultaneously displayed. In this case, the display of the media guidance data segment may include other media asset identifiers that are associated with another classifier included in the media guidance data segment. Specifically, a number of media asset identifiers in the first plurality of media asset identifiers may be less than a maximum number of media asset identifiers that can be included in the first media guidance data segment. For example, the maximum number of media asset identifiers that can be included in the first media guidance data segment may be nine. The first plurality of media asset identifiers may include only six media asset identifiers (e.g., media asset identifiers 112, 114, 116, 118, 120 and 122). In such instances, the first media guidance data segment may further comprise a fourth classifier and a second plurality of media asset identifiers corresponding to the fourth classifier. For example, the first media guidance data segment may also include media asset classifier 108 and three asset identifiers associated with media asset classifier 108. In a display of the first media guidance data segment, the first classifier and the fourth classifier may be positioned adjacent to each other and between the second classifier and the third classifier. Media asset classifier 106 (i.e., the first classifier) and media asset classifier 108 (i.e., the fourth classifier) may be positioned adjacent to each other and in between media asset classifier 104 (i.e., the second classifier) and media asset classifier 110 (i.e., the third classifier).

In some embodiments, the media guidance application may receive a user selection of a classifier of multiple classifiers included in a media guidance data segment. The media guidance application may retrieve and display another media guidance data segment associated with the selected classifier. The display of retrieved media guidance data segment may include a subset of classifiers that were included in the previous media guidance data segment. Specifically, the media guidance application may receive a user selection of the second classifier. Following from the previous example where the second classifier was media asset classifier 104, the media guidance application may receive a selection of media asset classifier 104.

The media guidance application may retrieve, from the remote server, a third media guidance data segment associated with the second classifier, where the third media guidance data segment comprises a second plurality of media asset classifiers that includes at least the first classifier, the second classifier, and a fourth classifier, and a second plurality of media asset identifiers corresponding to the second classifier. Upon receiving a selection of media asset classifier 104, the media guidance application may access a look-up table to determine an identifier for a data segment associated with media asset classifier 104. For example, the media guidance application may determine that an identifier for a data segment associated with media asset classifier 104 is CM-1. The media guidance application may then query content provider database for location of the data segment corresponding to identifier CM-1. For example, the media guidance application may retrieve the data segment corresponding to data segment identifier CM-1 that includes media asset classifier 106 (i.e., the first classifier), media asset classifier 104 (i.e., the second classifier), horror TV programs (i.e., the fourth classifier), media asset classifier 102 and media asset classifier 108. The data segment corresponding to data segment identifier CM-1 may also include media asset identifiers associated with media asset classifier 104 (e.g., "Groundhog Day," "Bridesmaids," "Clueless," "Zoolander," "Ice Age," and "Kung Fu Panda").

In some embodiments, in a display, the second classifier may be positioned between the first classifier and the fourth classifier. For example, media asset classifier 104 may be positioned between the media asset classifier 106 and the horror TV programs classifier. In some embodiments, each of the first classifier and the fourth classifier may be associated with at least one other data segment. Media asset classifier 106 may be associated with a data segment (e.g., data segment corresponding to data segment identifier FTP-1) that includes media asset identifiers associated with media asset classifier 106. The horror TV programs classifier may be associated with a data segment (e.g., the data segment corresponding to data segment identifier HTP-1) that includes media asset identifiers for horror TV programs. The media guidance application may generate for display, at the user equipment device, the third media guidance data segment. The media guidance application may display the data segment corresponding to data segment identifier CM-1 on a television.

In some embodiments, a display of a media guidance data segment that includes media asset identifiers associated with a first classifier may also include an indication that there are additional media asset identifiers associated with the first classifier that are not currently displayed. The media guidance application may display these additional media asset identifiers upon receiving a user request to view these additional media asset identifiers. The additional media asset identifiers may be organized in the display such that they all precede or they all follow the media asset identifiers that were initially displayed. Specifically, the first media guidance data segment may include an indication that there is a second plurality of media asset identifiers corresponding to the first classifier that includes a subset of media asset identifiers not included in the first plurality of media asset identifiers. For example, the first media guidance data segment may include a selectable indicator (e.g., "Next," "Previous," or "View more media asset") to indicate there are additional media asset identifiers associated with media asset classifier 106 that are not included in the first media guidance data segment. For example, display 100 may include selectable option 124 (e.g., "Next") for requesting access to additional media asset identifiers associated with media asset classifiers 106. For example, display 132 may include selectable option 134 (e.g., "Previous") for requesting access to additional media asset identifiers associated with media asset classifiers 106. The media guidance application may receive a user input requesting access to the second plurality of media asset identifiers corresponding to the first classifier. For example, the media guidance application may receive a selection of a selectable option 124 (e.g., "Next").

The media guidance application may retrieve, from the remote server, a third media guidance data segment that includes the second plurality of media asset identifiers. Upon receiving selection of the selectable option 124, the media guidance application may access a look-up table associated with the first media guidance data segment to determine a data segment identifier that corresponds to the selection of selectable option 124. The media guidance application may retrieve, from the remote server, a third media guidance data segment comprising the first plurality of media asset classifiers and the second plurality of media asset identifiers. For example, based on the look-up table, the media guidance application may determine that the data segment corresponding to data segment identifier FTP-6 is to be retrieved upon receiving a selection of selectable option 124. As an illustrative example, the media guidance application may retrieve the data segment corresponding to data segment identifier FTP-6 that includes media asset classifiers 102, 104, 106, 108 and 110 and media asset identifiers 136 and 138. The media guidance application may generate for display, at the user equipment device, the third media guidance data segment. For example, the media guidance application may display the data segment corresponding to data segment identifier FTP-6.

In some embodiments, the respective position of each media asset identifier of the subset media asset identifiers of the second plurality of media asset identifiers may precede a first media asset identifier of the first plurality of media asset identifiers, where the position of the first media asset identifier precedes the respective positions of all other media asset identifiers of the first plurality of media asset identifiers. For example, the first plurality of media asset identifiers may be ordered as media asset identifier 112, media asset identifier 114, media asset identifier 116, media asset identifier 118, media asset identifier 120 and media asset identifier 122, where media asset identifier 112 is the first media asset identifier. The positions of media asset identifiers 136 and 138 may be before media asset identifier 112.

In some embodiments, the respective position of each media asset identifier of the subset media asset identifiers of the second plurality of media asset identifiers may follow a last media asset identifier of the first plurality of media asset identifiers, where the position of the last media asset identifier follows the respective positions of all other media asset identifiers of the first plurality of media asset identifiers. For example, the first plurality of media asset identifiers may be ordered as media asset identifier 112, media asset identifier 114, media asset identifier 116, media asset identifier 118, media asset identifier 120 and media asset identifier 122, where media asset identifier 12 is the last media asset identifier. The positions of media asset identifiers media asset identifiers 136 and 138 may be after media asset identifier 122.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

As referred to herein, the term "in response to" refers to initiated as a result of. For example, a first action being performed in response to a second action may include interstitial steps between the first action and the second action.

As referred to herein, the term "directly in response to" refers to caused by. For example, a first action being performed directly in response to a second action may not include interstitial steps between the first action and the second action.

Figure 2:
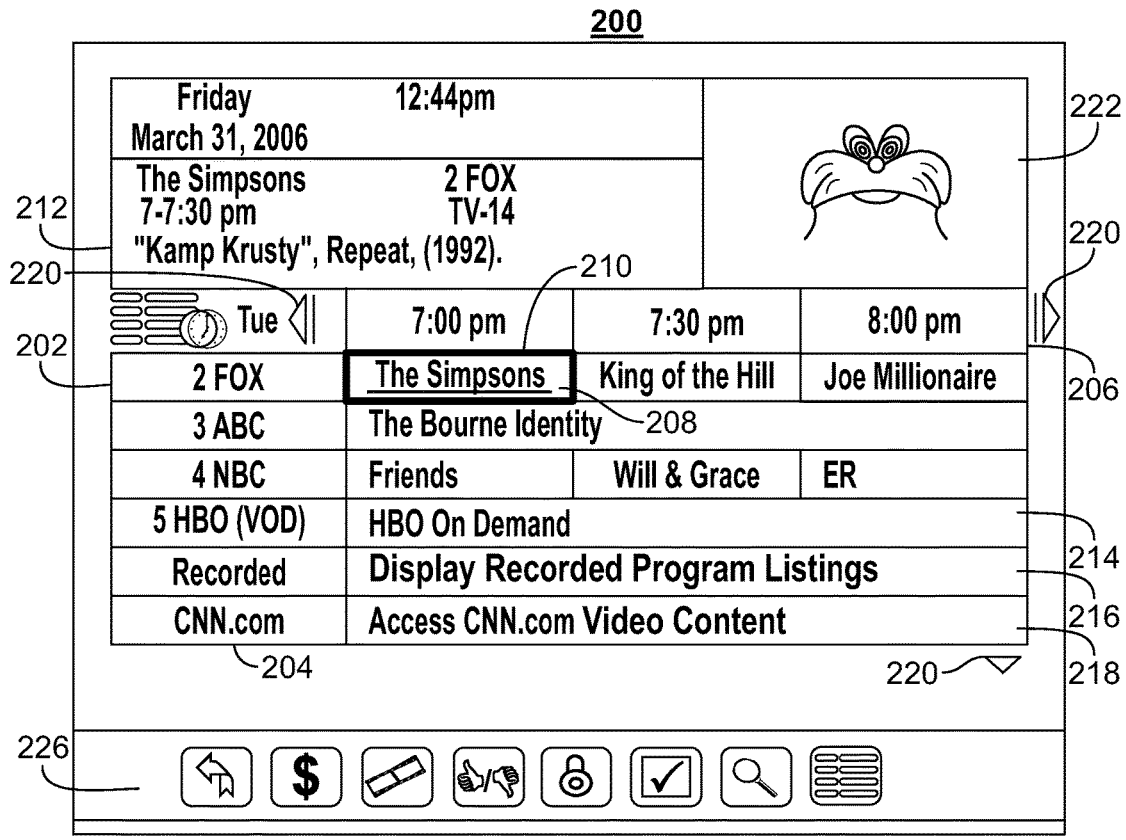
FIG. 2 shows another illustrative example of a display screen for use in accessing media content in accordance with some embodiments of the disclosure.
Figure 3:
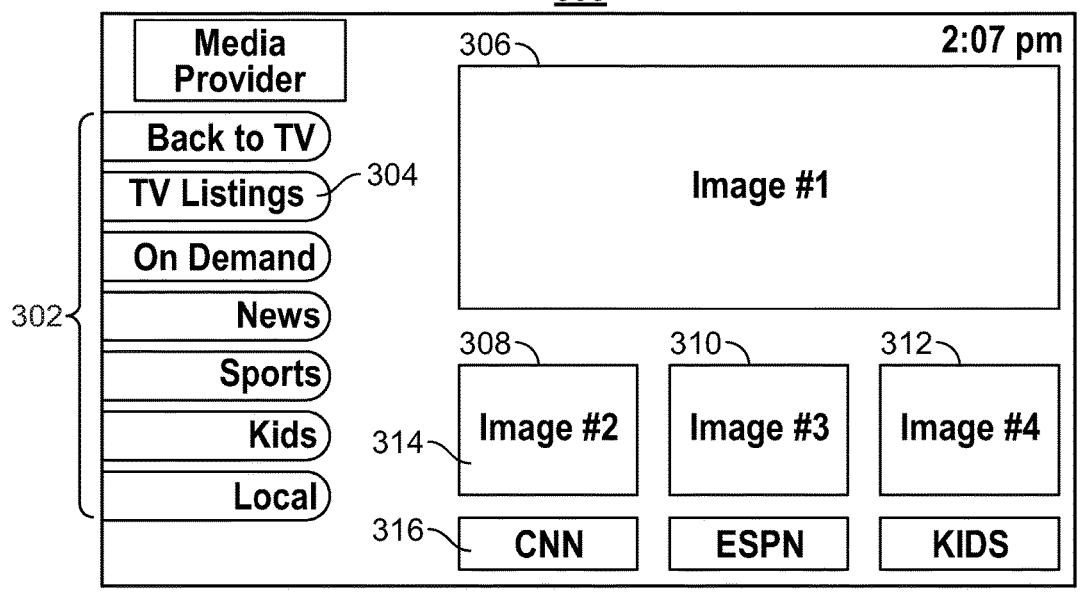
FIG. 3 shows yet another illustrative example of a display screen for use in accessing media content in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/

0153885, filed Nov. 12, 2009, which is hereby incorporated by reference herein in its entirety.

Figure 4:
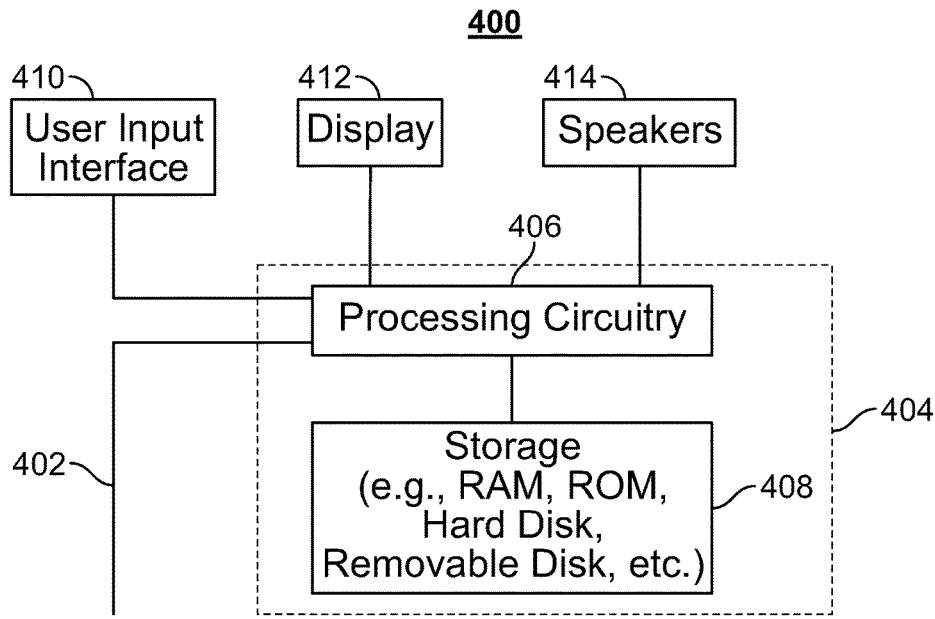
FIG. 4 is a block diagram of an illustrative user equipment device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

Figure 6:
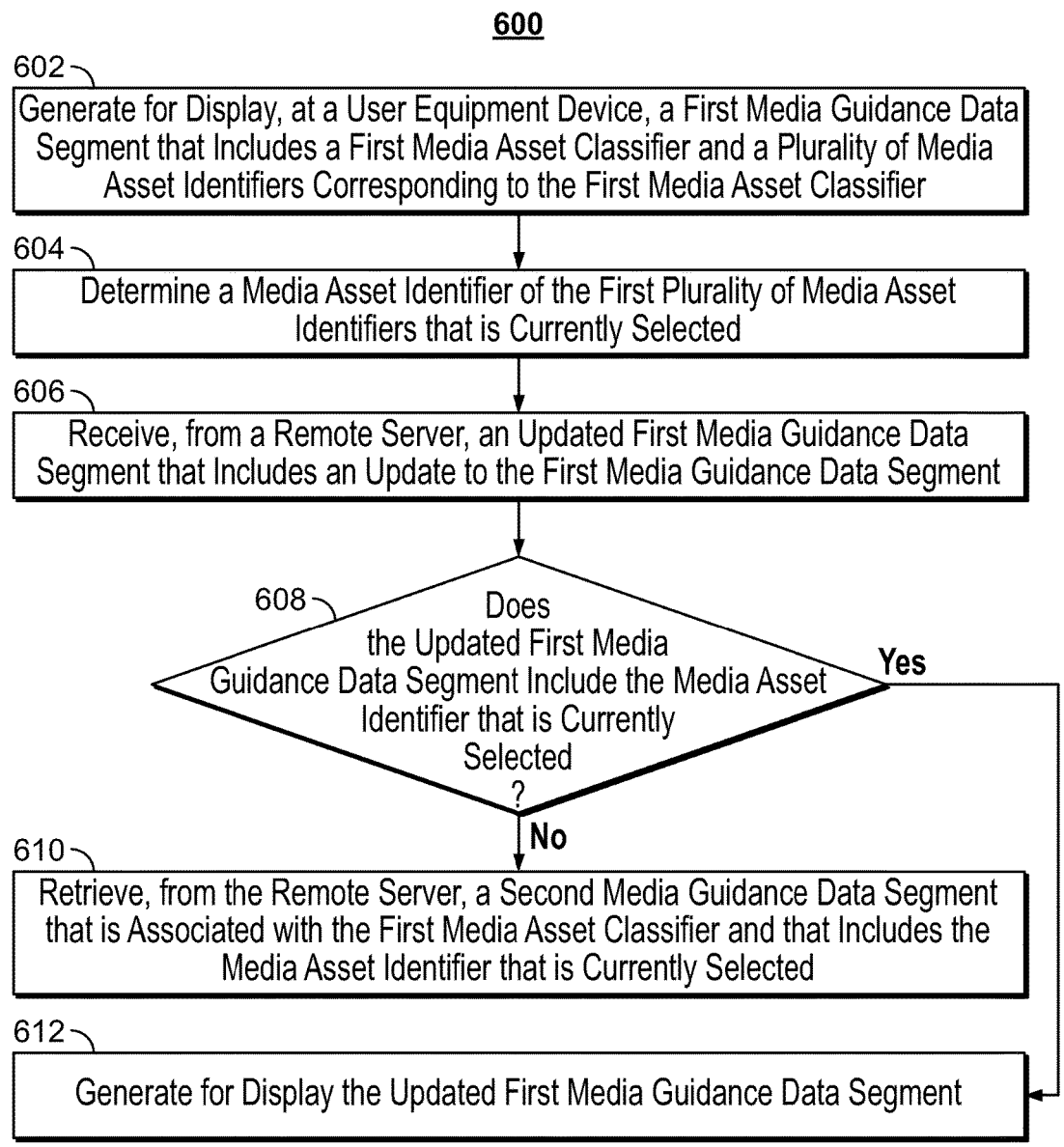
FIG. 6 is a flowchart of illustrative steps involved in substituting an updated segment of media guidance data that no longer includes a selected media asset identifier with another segment of media guidance data that includes the selected media asset identifier, in accordance with some embodiments of the disclosure.

FIG. 6 is a flowchart of illustrative steps involved in substituting an updated segment of media guidance data that no longer includes a selected media asset identifier with another segment of media guidance data that includes the selected media asset identifier, in accordance with some embodiments of the disclosure. Process 600 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 600 begins at 602 where control circuitry 404 generates for display, at a user equipment device, a first media guidance data segment that includes a first media asset classifier and a plurality of media asset identifiers corresponding to the first media asset classifier. For example, control circuitry 404 may generate for display, at any of user equipment 502, 504, and 506, display 100 that includes media asset classifier 106 and media asset identifiers 112, 114, 116, 118, 120 and 122 associated with media asset classifier 106. Process 600 continues to 604 where control circuitry 404 determines a media asset identifier of the first plurality of media asset identifiers that is currently selected. For example, control circuitry 404 may compare the coordinates of display 100 associated with cursor 146 with the coordinates of display 100 associated with media asset identifiers 112, 114, 116, 118, 120 and 122 to determine a match. The media guidance application may select the media asset identifiers associated with coordinates that match those associated with cursor 146 as the currently selected media asset identifier. For example, control circuitry 404 may determine that media asset identifier 122 is currently selected. Process 600 continues to 606 where control circuitry 404 receives, from a remote server, an updated first media guidance data segment that includes an update to the first media guidance data segment. Control circuitry 404 may receive an updated first media guidance data segment, such as the one shown in display 128, from media content source 516 and/or media guidance data source 518, via communication network 514. Alternatively, control circuitry 404 may query media content source 516 and/or media guidance data source 518 for an updated first media guidance data segment.

Figure 7:
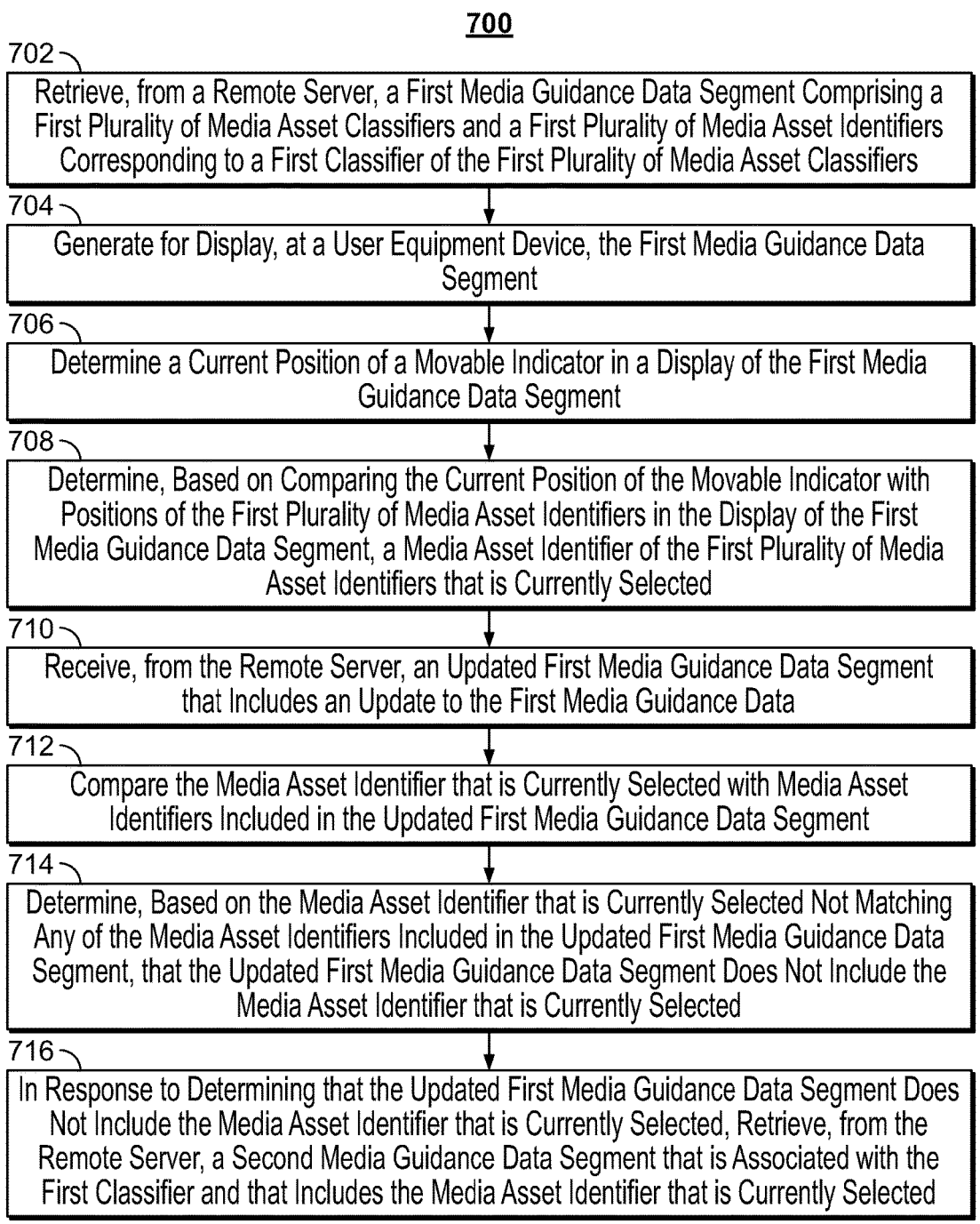
FIG. 7 is a flowchart of illustrative steps involved in determining that an updated segment of media guidance data that no longer includes a selected media asset identifier and retrieving another media guidance data segment that includes the selected media asset identifier.

Process 600 continues to 608 where control circuitry 404 determines whether the updated first media guidance data segment includes the media asset identifier that is currently selected. For example, control circuitry 404 determines whether the updated first media guidance data segment includes media asset identifier 122. If, at 608, control circuitry 404 determines that the updated first media guidance data segment does not include the media asset identifier that is currently selected, process 600 continues to 610. At 610, control circuitry 404 retrieves, from the remote server, a second media guidance data segment that is associated with the first media asset classifier and that includes the media asset identifier that is currently selected. For example, control circuitry 404 may retrieve, from media content source 516 and/or media guidance data source 518, the media guidance data segment associated with display 132. If, at 608, control circuitry 404 determines that the updated first media guidance data segment includes the media asset identifier that is currently selected, process 600 continues to 612. At 612, control circuitry 404 generates for display the updated first media guidance data segment FIG. 7 is a flowchart of illustrative steps involved in determining that an updated segment of media guidance data no longer includes a selected media asset identifier and retrieving another media guidance data segment that includes the selected media asset identifier. Process 700 may be executed by control circuitry 404 (FIG. 4) as instructed by the media guidance application. Control circuitry 404 may be implemented on user equipment 502, 504, and/or 506 (FIG. 5). In addition, one or more steps of process 600 may be incorporated into or combined with one or more steps of any other process or embodiment.

Process 700 begins at 702 where control circuitry 404 retrieves, from a remote server, a first media guidance data segment comprising a first plurality of media asset classifiers and a first plurality of media asset identifiers corresponding to a first classifier of the first plurality of media asset classifiers. For example, control circuitry 404 may access media content source 516 and/or media guidance data source 518, via communication network 514, to retrieve the first media guidance data segment. As an illustrative example, the first media guidance data segment may include media asset classifiers 102, 104, 106, 108 and 108 (e.g., comedy TV programs, comedy movies, fantasy TV programs, fantasy movies and drama TV programs respectively). The first media guidance data segment may also include media assets identifiers 112, 114, 116, 118, 120 and 122 (e.g., "Game of Thrones," "Westworld," "Supernatural," "Grimm," "Agents of S.H.I.E.L.D.," and "American Horror Story," respectively) that are all associated with media asset classifiers 106 (e.g., fantasy TV programs classifier).

Process 700 continues to 704 where control circuitry 404 generates for display, at a user equipment device, the first media guidance data segment. Control circuitry 404 may generate for display, on any of user television equipment 502, user computer equipment 504, wireless user communications device 506, display 100. Process 700 continues to 706 where control circuitry 404 determines a current position of a movable indicator in a display of the first media guidance data segment. As an illustrative example, the display 100 may be associated with a two-dimensional Cartesian coordinate system that uniquely defines each point in display 100. Cursor 146 may be associated with a location data structure that is continuously updated with the current coordinates for cursor 146 in display 100. Control circuitry 404 may access the location data structure, located at storage 408, to retrieve a current position of cursor 146 (e.g., (11,7)) in display 100. Process 700 continues to 708 where control circuitry 404 determines, based on comparing the current position of the movable indicator with positions of the first plurality of media asset identifiers in the display of the first media guidance data segment, a media asset identifier of the first plurality of media asset identifiers that is currently selected. As an illustrative example, a given media asset identifier may be associated with four coordinates and any point of the display that falls in the area defined by the four coordinates is associated with the given media asset identifier. Control circuitry 404 may access a data structure, located at storage 408, associated with the first media guidance data segment to retrieve the coordinates associated with media assets identifiers 112, 114, 116, 118, 120 and 122. For example, media asset identifier 122 (e.g., "American Horror Story") may be associated with coordinates (10,6), (12,6), (10,8) and (12,8). The media guidance application may determine, based on coordinates of the cursor (e.g., (11,7)) being included in the area encompassed by the coordinates for media asset identifier 122, the currently selected media asset is media asset identifier 122.

Process 700 continues to 710 where control circuitry 404 receives, from the remote server, an updated first media guidance data segment that includes an update to the first media guidance data. Control circuitry 404 may receive an updated first media guidance data segment, in manners described previously in relation to FIG. 6 and elsewhere in this application. For example, control circuitry 404 may retrieve an updated first media guidance data segment, such as the one shown in display 128. Process 700 continues to 712 where control circuitry 404 compares the media asset identifier that is currently selected with media asset identifiers included in the updated first media guidance data segment. Manners in which control circuitry 404 may perform the comparison of the media asset identifier that is currently selected with media asset identifiers included in the updated first media guidance data segment are discussed in greater detail in FIG. 8. Process 700 continues to 714 where control circuitry 404 determines, based on the media asset identifier that is currently selected not matching any of the media asset identifiers included in the updated first media guidance data segment, that the updated first media guidance data segment does not include the media asset identifier that is currently selected. For example, control circuitry 404 may determine that media asset identifier 122 is not included in the updated first media guidance data segment associated with display 128.

Process 700 continues to 716 where control circuitry 404, in response to determining that the updated first media guidance data segment does not include the media asset identifier that is currently selected, retrieves, from the remote server, a second media guidance data segment that is associated with the first classifier and that includes the media asset identifier that is currently selected. For example, control circuitry 404 may retrieve the data segment depicted in display 132. The media guidance application may generate for display, in display 132, media asset identifiers 122, 136, 138, 140, 142 and 144 that are associated with media asset classifier 106. Manners in which control circuitry 404 may identify the second media guidance data segment discussed previously are applicable here.

Figure 8:
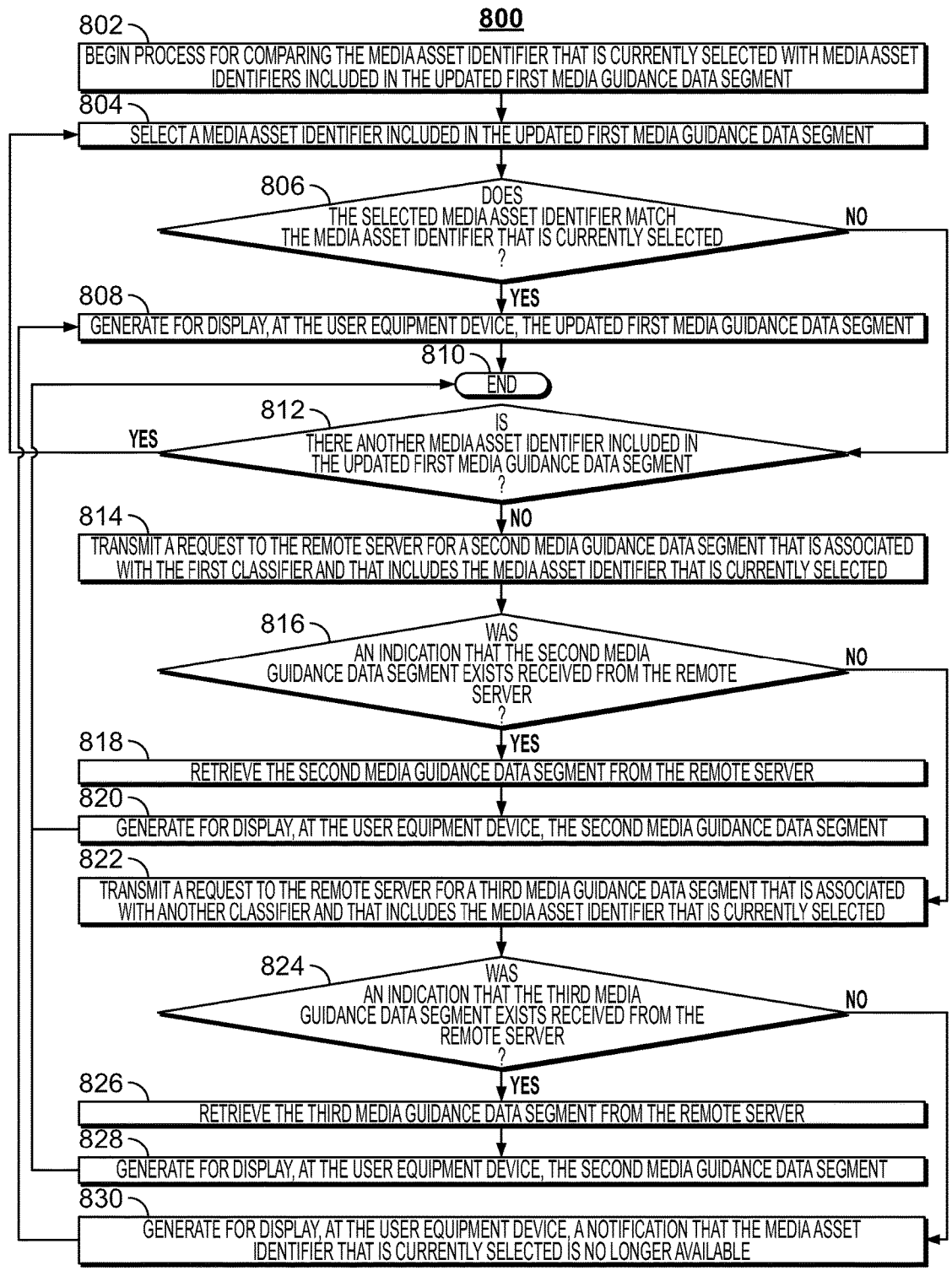
FIG. 8 is a flowchart of illustrative steps involved in determining a media guidance data segment for display following an update to a currently displayed media guidance data segment, in accordance with some embodiments of the disclosure.

FIG. 8 is a flowchart of illustrative steps involved in determining a media guidance data segment for display following an update to a currently displayed media guidance data segment, in accordance with some embodiments of the disclosure. Process 800 may be executed by control circuitry 404 (FIG. 4) as instructed by the media guidance application. Control circuitry 404 may be implemented on user equipment 502, 504, and/or 506 (FIG. 5). In addition, one or more steps of process 800 may be incorporated into or combined with one or more steps of any other process or embodiment.

Process 800 begins at 802 where control circuitry 404 begins the process for comparing the media asset identifier that is currently selected with media asset identifiers included in the updated first media guidance data segment. For example, control circuitry 404 may compare media asset identifier 122 with the media asset identifiers included in the updated first media guidance data segment depicted in display 128. Process 800 continues to 804 where control circuitry 404 selects a media asset identifier included in the updated first media guidance data segment. For example, control circuitry 404 may select media asset identifier 112. Process 800 continues to 806 where control circuitry 404 determines whether the selected media asset identifier matches the media asset identifier that is currently selected. If, at 806, control circuitry 404 determines that the selected media asset identifier matches the media asset identifier that is currently selected, process 800 continues to 808. At 808, control circuitry 404 generates for display, at the user equipment device, the updated first media guidance data segment. Process 800 then continues to 810 when process 800 terminates.

If, at 806, control circuitry 404 determines that the selected media asset identifier does not match the media asset identifier that is currently selected, process 800 continues to 812. At 812, control circuitry 404 determines whether there is there another media asset identifier included in the updated first media guidance data segment. For example, upon determining that media asset identifier 112 does not match the currently selected media asset identifier 122, control circuitry 404 may determine whether the updated first media guidance data segment associated with display 128 includes another media asset identifier. If, at 812, control circuitry 404 determines that there is another media asset identifier that is included in the updated first media guidance data segment, process 800 reverts to 804. For example, control circuitry 404 may determine that the updated first media guidance data segment associated with display 128 also includes media asset identifiers 114, 116, 118, 120 and 130 and proceed to 804. If, at 812, control circuitry 404 determines that there is not another media asset identifier that is included in the updated first media guidance data segment, process 800 continues to 814. For example, control circuitry 404 may determine that the updated first media guidance data segment does not include any more media asset identifiers after it has selected media asset identifiers 130.

At 814, control circuitry 404 transmits a request to the remote server for a second media guidance data segment that is associated with the first classifier and that includes the media asset identifier that is currently selected. For example, control circuitry 404 may transmit a request to media content source 516 and/or media guidance data source 518 for a second media guidance data segment that is associated with media asset classifier 106 and that includes media asset identifier 122. Process 800 continues to 816 where control circuitry 404 determines whether an indication that the second media guidance data segment exists was received from the remote server. For example, control circuitry 404 determines whether a segment identifier for the second media guidance data segment was received. If, at 816, control circuitry 404 determines that an indication that the second media guidance data segment exists was received from the remote server, process 800 continues to 818. At 818, control circuitry 404 retrieves the second media guidance data segment from the remote server. Process 800 continues to 820 where control circuitry 404 generates for display, at the user equipment device, the second media guidance data segment. Process 800 continues to 810 where process 800 ends. For example, control circuitry 404 may retrieve, from any of media content source 516 and/or media guidance data source 518, a second media guidance data segment, such as the one depicted in display 132.

If, at 816, control circuitry 404 determines that an indication that the second media guidance data segment exists was not received from the remote server, process 800 continues to 822. For example, process 800 may continue to 822 upon receiving a null result in response to the query for a data segment that includes media asset identifier 122 and is associated with media asset classifier 106. At 822, process 800 transmits a request to the remote server for a third media guidance data segment that is associated with another classifier and that includes the media asset identifier that is currently selected. Process 800 continues to 824 where control circuitry 404 determines whether an indication that the third media guidance data segment exists was received from the remote server. If, at 824, control circuitry 404 determines that an indication that the third media guidance data segment exists was received from the remote server, process 800 continues to 826. For example, control circuitry 404 may receive a segment identifier for the third media guidance data segment. At 826, control circuitry 404 retrieves the third media guidance data segment from the remote server. Process 800 then continues to 828 where control circuitry 404 generates for display, at the user equipment device, the second media guidance data segment. Process 800 then continues to 810 where process 800 ends.

If, at 824, control circuitry 404 determines that an indication that the third media guidance data segment exists was not received from the remote server, process 800 continues to 830. At 830, control circuitry 404 generates for display, at the user equipment device, a notification that the media asset identifier that is currently selected is no longer available. Process 800 then reverts to 808 where control circuitry 404 generates for display, at the user equipment device, the updated first media guidance data segment.

It should be noted that processes 600-800 or any step thereof could be performed on, or provided by, any of the devices shown in FIGS. 4-5. For example, any of processes 600-800 may be executed by control circuitry 404 (FIG. 4) as instructed by the media guidance application implemented on user equipment 502, 504, and/or 506 (FIG. 5). In addition, one or more steps of process 600-800 may be incorporated into or combined with one or more steps of any other process or embodiment.

It is contemplated that the steps or descriptions of FIGS. 6-8 may be used with any other embodiment of this disclosure. In addition, the steps and descriptions described in relation to FIGS. 6-8 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for generating for display segments of media guidance data, the method comprising:

retrieving, from a remote server, a first media guidance data segment comprising a first plurality of media asset classifiers and a first plurality of media asset identifiers corresponding to a first classifier of the first plurality of media asset classifiers;

generating for display, at a user equipment device, the first media guidance data segment;

determining a current position of a movable indicator in a display of the first media guidance data segment;

determining, based on comparing the current position of the movable indicator with positions of the first plurality of media asset identifiers in the display of the first media guidance data segment, a media asset identifier of the first plurality of media asset identifiers that is currently selected, the media asset identifier represents a title of a media asset;

receiving, from the remote server, an updated first media guidance data segment that includes an update to the first media guidance data;

comparing the title represented by the media asset identifier that is currently selected with titles represented by media asset identifiers included in the updated first media guidance data segment;

determining, based on the comparing, that none of the titles represented by the media asset identifiers included in the updated first media guidance data segment matches the title represented by the media asset identifier that is currently selected;

determining, in response to determining that none of the titles represented by the media asset identifiers included in the updated first media guidance data segment matches the title represented by the media asset identifier that is currently selected, that the updated first media guidance data segment does not include the title represented by the media asset identifier that is currently selected; and in response to determining that the updated first media guidance data segment does not include the title represented by the media asset identifier that is currently selected, retrieving, from the remote server, a second media guidance data segment that is associated with the first classifier and that includes the title represented by the media asset identifier that is currently selected.

2. The method of claim 1, further comprising:

determining a plurality of media guidance data segments that are associated with the first classifier;

comparing the media asset identifier that is currently selected with media asset identifiers included in the plurality of media guidance data segments that are associated with the first classifier;

determining, based on the media asset identifier that is currently selected not matching any of the media asset identifiers included in the plurality of media guidance data segments that are associated with the first classifier, that there is no other media guidance data segment that is associated with the first classifier and that includes the media asset identifier that is currently selected; and transmitting a request to the remote server for a media guidance data segment that is associated with another classifier and that includes the media asset identifier that is currently selected.

3. The method of claim 2, further comprising:

receiving, from the remote server, an indication that there exists a media guidance data segment that is associated with another classifier and that includes the media asset identifier that is currently selected;

determining, based on an entry in a settings data structure, that no user input is required prior to displaying the media guidance data segment that is associated with another classifier and that includes the media asset identifier that is currently selected;

retrieving, from the remote server, the media guidance data segment that is associated with another classifier and that includes the media asset identifier that is currently selected; and generating for display, at the user equipment device, the media guidance data segment that is associated with another classifier and that includes the media asset identifier that is currently selected.

4. The method of claim 2, further comprising:

receiving, from the remote server, an indication that there exists a media guidance data segment that is associated with another classifier and that includes the media asset identifier that is currently selected;

determining, based on an entry in a settings data structure, that user input is required prior to displaying the media guidance data segment that is associated with another classifier and that includes the media asset identifier that is currently selected;

generating for display, at the user equipment device, a notification about the existence of the media guidance data segment that is associated with another classifier and that includes the media asset identifier, wherein the notification includes a selectable option for receiving user input to display the media guidance data segment that is associated with another classifier and that includes the media asset identifier that is currently selected;

in response to receiving a selection of the selectable option, retrieving, from the remote server, the media guidance data segment that is associated with another classifier and that includes the media asset identifier that is currently selected; and generating for display, at the user equipment device, the media guidance data segment that is associated with another classifier and that includes the media asset identifier that is currently selected.

5. The method of claim 2, further comprising:

receiving, from the remote server, an indication that there is no media guidance data segment that is associated with another classifier and that includes the media asset identifier that is currently selected; and generating for display, at the user equipment device, a notification that the media asset identifier that is currently selected is no longer available.

6. The method of claim 1, wherein the display of the first media guidance data segment comprises the first classifier positioned between a second classifier and a third classifier of the first plurality of media asset classifiers, and wherein each of the second classifier and the third classifier is associated with at least one other media guidance data segment.

7. The method of claim 1, wherein a number of media asset identifiers in the first plurality of media asset identifiers is less than a maximum number of media asset identifiers that can be included in the first media guidance data segment, and wherein the first media guidance data segment further comprises a fourth classifier and a second plurality of media asset identifiers corresponding to the fourth classifier, and wherein, in the display of the first media guidance data segment, the first classifier and the fourth classifier are positioned adjacent to each other and between a second classifier and a third classifier of the first plurality of media asset classifiers.

8. The method of claim 7, further comprising:
receiving a user selection of the second classifier;
retrieving, from the remote server, a third media guidance data segment associated with the second classifier, wherein the third media guidance data segment comprises a second plurality of media asset classifiers that includes at least the first classifier, the second classifier, and a fourth classifier, and a second plurality of media asset identifiers corresponding to the second classifier, wherein, in a display of the third media guidance data segment, the second classifier is positioned between the first classifier and the fourth classifier, and wherein each of the first classifier and the fourth classifier is associated with at least one other data segment; and
generating for display, at the user equipment device, the third media guidance data segment.

9. The method of claim 1, wherein the first media guidance data segment includes an indication that there is a second plurality of media asset identifiers corresponding to the first classifier that includes a subset of media asset identifiers not included in the first plurality of media asset identifiers, further comprising:
receiving a user input requesting access to the second plurality of media asset identifiers corresponding to the first classifier;
retrieving, from the remote server, a third media guidance data segment that includes the second plurality of media asset identifiers; and
generating for display, at the user equipment device, the third media guidance data segment.

10. The method of claim 9, wherein respective position of each media asset identifier of the subset media asset identifiers of the second plurality of media asset identifiers is at least one of:
preceding a first media asset identifier of the first plurality of media asset identifiers, wherein position of the first media asset identifier precedes respective positions of all other media asset identifiers of the first plurality of media asset identifiers; and
following a last media asset identifier of the first plurality of media asset identifiers, wherein position of the last media asset identifier follows respective positions of all other media asset identifiers of the first plurality of media asset identifiers.

11. A system for generating for display segments of media guidance data, the system comprising:
communications circuitry; and
control circuitry configured to:
retrieve, using the communications circuitry, from a remote server, a first media guidance data segment comprising a first plurality of media asset classifiers and a first plurality of media asset identifiers corresponding to a first classifier of the first plurality of media asset classifiers;
generate for display, at a user equipment device, the first media guidance data segment;
determine a current position of a movable indicator in a display of the first media guidance data segment;
determine, based on comparing the current position of the movable indicator with positions of the first plurality of media asset identifiers in the display of the first media guidance data segment, a media asset identifier of the first plurality of media asset identifiers that is currently selected, the media asset identifier represents a title of a media asset;
receive, from the remote server, an updated first media guidance data segment that includes an update to the first media guidance data;
compare the title represented by the media asset identifier that is currently selected with titles represented by media asset identifiers included in the updated first media guidance data segment;
determine, based on the comparing, that none of the titles represented by the media asset identifiers included in the updated first media guidance data segment matches the title represented by the media asset identifier that is currently selected;
determine, in response to determining that none of the titles represented by the media asset identifiers included in the updated first media guidance data segment matches the title represented by the media asset identifier that is currently selected, that the updated first media guidance data segment does not include the title represented by the media asset identifier that is currently selected; and
in response to determining that the updated first media guidance data segment does not include the title represented by the media asset identifier that is currently selected, retrieve, using the communications circuitry, the remote server, a second media guidance data segment that is associated with the first classifier and that includes the title represented by the media asset identifier that is currently selected.

12. The system of claim 11, wherein the control circuitry is further configured to:
determine a plurality of media guidance data segments that are associated with the first classifier;
compare the media asset identifier that is currently selected with media asset identifiers included in the plurality of media guidance data segments that are associated with the first classifier;
determine, based on the media asset identifier that is currently selected not matching any of the media asset identifiers included in the plurality of media guidance data segments that are associated with the first classifier, that there is no other media guidance data segment that is associated with the first classifier and that includes the media asset identifier that is currently selected; and
transmit, using the communications circuitry, a request to the remote server for a media guidance data segment that is associated with another classifier and that includes the media asset identifier that is currently selected.

13. The system of claim 12, wherein the control circuitry is further configured to:
   receive, using the communications circuitry, from the remote server, an indication that there exists a media guidance data segment that is associated with another classifier and that includes the media asset identifier that is currently selected;
   determine, based on an entry in a settings data structure, that no user input is required prior to displaying the media guidance data segment that is associated with another classifier and that includes the media asset identifier that is currently selected;
   retrieve, using the communications circuitry, from the remote server, the media guidance data segment that is associated with another classifier and that includes the media asset identifier that is currently selected; and
   generate for display, at the user equipment device, the media guidance data segment that is associated with another classifier and that includes the media asset identifier that is currently selected.

14. The system of claim 12, wherein the control circuitry is further configured to:
   receive, using the communications circuitry, from the remote server, an indication that there exists a media guidance data segment that is associated with another classifier and that includes the media asset identifier that is currently selected;
   determine, based on an entry in a settings data structure, that user input is required prior to displaying the media guidance data segment that is associated with another classifier and that includes the media asset identifier that is currently selected;
   generate for display, at the user equipment device, a notification about the existence of the media guidance data segment that is associated with another classifier and that includes the media asset identifier, wherein the notification includes a selectable option for receiving user input to display the media guidance data segment that is associated with another classifier and that includes the media asset identifier that is currently selected;
   in response to receiving a selection of the selectable option, retrieve, using the communications circuitry, from the remote server, the media guidance data segment that is associated with another classifier and that includes the media asset identifier that is currently selected; and
   generate for display, at the user equipment device, the media guidance data segment that is associated with another classifier and that includes the media asset identifier that is currently selected.

15. The system of claim 12, wherein the control circuitry is further configured to:
   receive, using the communications circuitry, from the remote server, an indication that there is no media guidance data segment that is associated with another classifier and that includes the media asset identifier that is currently selected; and
   generate for display, at the user equipment device, a notification that the media asset identifier that is currently selected is no longer available.

16. The system of claim 11, wherein the display of the first media guidance data segment comprises the first classifier positioned between a second classifier and a third classifier of the first plurality of media asset classifiers, and wherein each of the second classifier and the third classifier is associated with at least one other media guidance data segment.

17. The system of claim 11, wherein a number of media asset identifiers in the first plurality of media asset identifiers is less than a maximum number of media asset identifiers that can be included in the first media guidance data segment, and wherein the first media guidance data segment further comprises a fourth classifier and a second plurality of media asset identifiers corresponding to the fourth classifier, and wherein, in the display of the first media guidance data segment, the first classifier and the fourth classifier are positioned adjacent to each other and between a second classifier and a third classifier of the first plurality of media asset classifiers.

18. The system of claim 17, wherein the control circuitry is further configured to:
   receive a user selection of the second classifier;
   retrieve, using the communications circuitry, from the remote server, a third media guidance data segment associated with the second classifier, wherein the third media guidance data segment comprises a second plurality of media asset classifiers that includes at least the first classifier, the second classifier, and a fourth classifier, and a second plurality of media asset identifiers corresponding to the second classifier, wherein, in a display of the third media guidance data segment, the second classifier is positioned between the first classifier and the fourth classifier, and wherein each of the first classifier and the fourth classifier is associated with at least one other data segment; and
   generate for display, at the user equipment device, the third media guidance data segment.

19. The system of claim 11, wherein the first media guidance data segment includes an indication that there is a second plurality of media asset identifiers corresponding to the first classifier that includes a subset of media asset identifiers not included in the first plurality of media asset identifiers, wherein the control circuitry is further configured to:
   receive a user input requesting access to the second plurality of media asset identifiers corresponding to the first classifier;
   retrieve, using the communications circuitry, from the remote server, a third media guidance data segment that includes the second plurality of media asset identifiers; and
   generate for display, at the user equipment device, the third media guidance data segment.

20. The system of claim 19, wherein respective position of each media asset identifier of the subset media asset identifiers of the second plurality of media asset identifiers is at least one of:
   preceding a first media asset identifier of the first plurality of media asset identifiers, wherein position of the first media asset identifier precedes respective positions of all other media asset identifiers of the first plurality of media asset identifiers; and
   following a last media asset identifier of the first plurality of media asset identifiers, wherein position of the last media asset identifier follows respective positions of all other media asset identifiers of the first plurality of media asset identifiers.

* * * * *